US010035581B2

(12) United States Patent
Wood

(10) Patent No.: US 10,035,581 B2
(45) Date of Patent: Jul. 31, 2018

(54) MULTI-ROTOR UAV WITH COMPACT FOLDING ROTOR ARMS

(71) Applicant: Zenon Dragan, Saskatoon (CA)

(72) Inventor: Greg Wood, Saskatoon (CA)

(73) Assignee: Draganfly Innovations, Inc., Saskatoon, Saskatchewan (CA)

( * ) Notice: Subject to any disclaimer, the term of this patent is extended or adjusted under 35 U.S.C. 154(b) by 253 days.

(21) Appl. No.: 14/994,080

(22) Filed: Jan. 12, 2016

(65) Prior Publication Data
US 2017/0197703 A1     Jul. 13, 2017

(51) Int. Cl.
*B64G 1/00*       (2006.01)
*B64C 11/46*      (2006.01)
*B64C 27/08*      (2006.01)
*B64C 39/02*      (2006.01)

(52) U.S. Cl.
CPC ............. *B64C 11/46* (2013.01); *B64C 27/08* (2013.01); *B64C 39/024* (2013.01); *B64C 2201/024* (2013.01)

(58) Field of Classification Search
CPC ........ B64C 2201/024; B64C 2201/027; B64C 2201/042; B64C 2201/108; B64C 39/024; B64C 11/46; B64C 2203/00
See application file for complete search history.

(56) References Cited

U.S. PATENT DOCUMENTS

| 9,783,294 B2* | 10/2017 | Johannesson ......... B64C 39/024 |
| 2010/0108801 A1* | 5/2010 | Olm ..................... B64C 39/024 244/17.23 |
| 2015/0321755 A1* | 11/2015 | Martin ................... B64C 27/50 244/17.23 |
| 2016/0122016 A1* | 5/2016 | Mintchev .............. B64C 39/024 244/17.23 |
| 2016/0159471 A1* | 6/2016 | Chan ..................... B64C 39/024 244/39 |
| 2017/0043870 A1* | 2/2017 | Wu ........................ B64C 27/08 |

* cited by examiner

*Primary Examiner* — Richard G Davis
(74) *Attorney, Agent, or Firm* — NK Patent Law, PLLC

(57) ABSTRACT

A multi-rotor UAV comprises a body and a plurality of rotor arms extending radially from the body. A rotor assembly is connected to an outside end of each rotor arm. An attachment interface is connected to the body and provides rotor arm attachment points for attaching the rotor arms to the body and pivoting the rotor arms from an unfolded operating position, to a folded position wherein the rotor arms are pivoted such that an outer arm portion of each rotor arm is enabled to cross the pivot end and an inner arm portion of an adjacent rotor arm.

26 Claims, 27 Drawing Sheets

MULTI-ROTOR UAV WITH COMPACT FOLDING ROTOR ARMS

BACKGROUND

Field of the Invention

The present invention relates to unmanned aerial vehicles (UAVs), also referred to as "drones", with compact folding rotor arms.

Background of the Invention

In the past number of years there has been increased awareness and use of UAVs in many applications from consumer through to commercial and safety applications. Such aerial missions include, for example, surveillance with associated data acquisition and one-way delivery of small payloads. Typically, rotary wing type UAVs are preferred over fixed wing aircraft due to: the ability to vertically takeoff and land from a static position; the ability to hover; the ability to move sideways; and, the ability to quickly transition between the different types of movement.

More recently, multi-rotor UAV designs using a plurality of pairs of fixed pitched propellers—with one propeller rotating clockwise and one propeller rotating counter-clockwise—are employed in numerous designs of UAVs. Control of the multi-rotor UAV is achieved by altering the rotation rate of one or more of the propellers to change torque and lift using an electronic control system and electronic sensors.

There are several advantages of the multi-rotor UAV design compared to a single-rotor design. First, the multi-rotor UAV design does not require mechanical linkages to vary the rotor blade pitch angle while rotating, thus substantially simplifying the construction and maintenance of the aircraft. Second, the use of a plurality of rotors allows each rotor to have a smaller diameter, thus reducing the kinetic energy of each rotor during flight resulting in a simpler and safer construction of the aircraft.

Typically, a multi-rotor UAV comprises a body having a plurality of rotor arms extending radially therefrom with a rotor assembly connected to an outside end of each rotor arm, as disclosed, for example, in US Patent Applications 2010/108801 and 2012/138732. The rotor arms are connected to the body such that the rotor arms can be pivoted from an ope or operational flying position, where the rotor arms extend radially outward from the body such that the rotor assemblies are spaced in a desired configuration, to a folded position where the rotor arms are positioned substantially parallel and adjacent to each other for transport and storage making the multi-rotor UAV less susceptible to damage.

One of the current limitations however is that present attachment interfaces such as those disclosed in US Patent Applications 2010/108801 and 2012/138732 still leave the folded rotor arms extending outward from the body on one side thereof, making handling of the folded multi-rotor UAV during transport and storage awkward and making the rotor arms and rotor assemblies susceptible to damage. It would be desireable and accepted in the multi-rotor UAV industry to develop a new folding design for a multi-rotor UAV that allowed for maximum collapsibility of the multi-rotor UAV into the folded or storage/transport position.

Furthermore, recent designs of multi-rotor UAVs comprise more than 4 rotor arms—such as, for example, 6 or 8—for further reducing the size of the rotor assemblies or rotor blades and providing further improved control of the aircraft, in particular in case of loss of a rotor assembly in operation. Unfortunately, use of more than 4 rotor arms substantially complicates the folding of the rotor arms. If it were possible to come up with a novel design for a folding multi-rotor UAV that allowed for the collapsibility of the multi-rotor UAV to be enhanced or retained even in cases where more than 4 rotor arms were present in the multi-rotor UAV it is felt that this would also be commercially successful.

BRIEF SUMMARY

A first object of the present invention is to provide a multi-rotor UAV with a plurality of rotor arms, each rotor arm having a rotor assembly thereon, whereby the rotor arms can be folded into a substantially compact form, enhanced over current prior art approaches. This will provide a multi-rotor UAV with an unfolded operating position, and a folded transportation or storage position.

Another object of the present invention is to provide a multi-rotor UAV which incorporates an attachment interface enabling the rotor arms which are pivotally attached thereto to be folded, such that any extension of the rotor arms outside of the circumference of the body of the multi-rotor UAV in the folded position is minimized or substantially reduced over prior art approaches.

A further object of the present invention is to provide a foldable multi-rotor UAV witch by virtue of the configuration and attachment of the rotor arms to the attachment interface enables more than four rotor arms to be folded into a substantially compact form. It is believed that multi-rotor UAV which met these general criteria would be commercially advantageous and accepted in the marketplace.

The invention accomplishes these objectives comprising a multi-rotor UAV which has an unfolded position and a folded position. The unfolded position is the operating position for the multi-rotor UAV—i.e. with the rotor assemblies in their extended operating configuration—whereas the folded position as a transportation or storage position, in which the overall shape and footprint of the multi-rotor UAV is minimized. The multi-rotor UAV comprises a body, which could be the body of a typical or conventional multi-rotor UAV or could be a purpose built body for this purpose. In addition to the body, the multi-rotor UAV also comprises a plurality of rotor arms, each of which has a pivot end and an outside end, with an inner arm portion extending from the pivot end thereof towards the centre of the rotor arm, and an outer arm portion extending from the outside end towards the centre of the rotor arm. There is a rotor assembly attached to the outside end of each rotor arm. The rotor assembly, as will be understood by those skilled in the art of design of these products, is typically a rotor with an electrical motor attached thereto.

The rotor arms are pivotally attached about the circumference of the body at a plurality of rotor arm attachment points. The plurality of rotor arm attachment points could either be directly on the body, or could be integrated as a part of an extra component called an attachment interface or folding mechanism. For the purposes of simplest installation and manufacturer it is primarily contemplated that a separate attachment interface component would be used in the manufacture of embodiments of a multi-rotor UAV in accordance with the present invention, versus placing the plurality of rotor arm attachment points directly on the body of the multi-rotor UAV, in part because in many cases the body itself may not be round in circumference, making the geometry of the invention far more difficult to practice. As such the embodiments of the invention outlined herein primarily concentrate on the use of a circular attachment interface component to provide for the actual attachment surface of attachment points for the rotor arms to the body, although it will be understood to those skilled in the art of design of these types of products that by either modifying the geometry or manufacturing a multi-rotor UAV that otherwise had a circular body, the need for freestanding or separate attachment interface component or components could be obviated without departing from the intended scope of the present invention.

In most cases then, the rotor arms are attached to the body of the multi-rotor UAV via an attachment interface. The attachment interface is placed about the central vertical axis of the body, and the pivot end of each rotor arm is pivotally attached at a rotor arm attachment point to the attachment interface. When pivotally attached to the attachment interface, the rotor arms can pivot between the folded position and the unfolded position of the multi-rotor UAV. As outlined above, the attachment interface itself can either be an integral aspect of the body of the multi-rotor UAV, or could comprise add-on components for retrofit or original manufacturer purposes.

When the multi-rotor UAV is in its unfolded position, each rotor arm extends radially outwardly from the body such that the rotor assembly attached thereto is spaced at a predetermined operating location and configuration in relation to the other rotor assemblies. When the multi-rotor UAV is in the folded position, each rotor arm is pivoted from its outside end towards the body such that the outer arm portion of the rotor arm is enabled to cross the pivot end thereof and the inner arm portion of an adjacent rotor arm.

It is generally speaking contemplated that the rotor arm attachment points would be spaced at regular intervals around the circumference of the body and in relation to the central vertical axis thereof. In most embodiments, the rotor arms when in the unfolded position would result in the location of the rotor assemblies in equidistant positions from the central vertical axis. It will be understood however that with modifications to the overall equipment shift, unequal spacing of the rotor arms around the circumference of the body or the attachment interface, or a customized deployment pattern for the rotor assembly is in the operating mode, could also be executed or manufactured without departing from the overall scope and intention of the present invention.

Several different configurations of the attachment interface components and the pivotal attachment of the rotor arms to the body or the attachment interface are contemplated within the scope of the present invention. As will be described below, the centre around different hinging configurations for the rotor arms resulting in different folding characteristics as they are folded into the folded position.

In some embodiments of the multi-rotor UAV contemplated herein, the pivotal attachment of the plurality of rotor arms to the attachment interface is such that alternating rotor arms will deflect in opposing upwards or downwards directions in relation to a plane perpendicular to the central vertical axis of body when moved into the folded position. in other embodiments, the pivotal attachment of the group of rotor arms to the attachment interface is such that all of the rotor arms would deflect in the same upwards or downwards direction in relation to a plane perpendicular to the central vertical axis of the body when moved into the folded position.

In addition to the potential to alternate the deflection direction of individual rotor arms in relation to a plane perpendicular to the central vertical axis of the body, other embodiments of the present invention might have the rotor arms mounted such that while they all deflect in the same direction from a plane perpendicular to the central vertical axis of the body they deflect at varying angles, so as to again allow for interlocking of the rotor arms in the folded position and minimizing the overall size of the collapsed or folded unit.

Deflection of the rotor arms at the same or varying angles is all contemplated within the scope of the present invention.

The physical attachment of each rotor arm to the body or the attachment interface could be any type of a pivotal attachment, including a hinge. The hinge could allow for hinged or pivoting movement of the attached rotor arm on one or more axes.

There are many types of attachment interface components which could be manufactured for use in accordance with the system of the present invention. In some embodiments, the attachment interface could comprise an inner ring which was disposed in a plane perpendicular to the central vertical axis of the body, which had a plurality of spokes connected to that inner ring and extending beyond an outside perimeter thereof a predetermined distance, the number of spokes corresponding to the number of rotor arms. The spokes could be adapted to assist in holding the rotor arms in the extended or unfolded positions. In some embodiments, this attachment interface might also include another concentric outer ring located outside of and planer with the inner ring, also attached to the spokes with them extending a predetermined distance outside the perimeter thereof. This type of an attachment interface as is outlined in further detail herein is contemplated specifically to allow for the execution of the folding method of the present invention, although it will be understood by those skilled in the art that many different types of attachment interfaces could be used without departing from the scope and intention here off, so long as the same geometric and mechanical effect of the folding of the rotor arms between a folded and unfolded position was accomplished.

In another embodiment of the attachment interface of the present invention, the attachment interface could include an odd numbered group of attachment interfaces each of which was mounted perpendicular to the central vertical axis of the body and mirrored each other except being mounted parallel and apart from each other such that space is defined therebetween, between adjacent pairs of the attachment interfaces, could define the rotor arm attachment points. In this type of an embodiment of an attachment interface, adjacent rotor arms could be attached at their pivot ends between differing adjacent pairs of attachment interfaces, which would allow for additional folding and mechanical characteristics depending upon the number of rotor arms or their size or shape which was desired to be used.

Either an even or an odd number of rotor arms could be used in the multi-rotor UAV of the present invention. Certain modifications to the folding method and the attachment interface may need to be made depending upon the number of rotor arms.

Where the plurality of rotor arms was an even number of rotor arms, the rotor arms could be divided into rotor arm pairs, each of which rotor arm pair had an even rotor arm and an odd rotor arm. In this type of an embodiment, the outer arm portion of the even rotor arm of a rotor arm pair could cross over the pivot end and the inner arm portion of the odd rotor arm of an adjacent rotor arm pair when in the folded position. In some embodiments, the even rotor arm and the odd rotor arm of each rotor arm pair could pivot in opposite directions from each other in relation to the circumference of the body when moving into the folded position. In other embodiments, the even rotor arm and the odd rotor arm could pivot in the same direction as each other in relation to the circumference of the body when moving into the fold position. Both such approaches are contemplated within the scope of the present invention.

It is specifically contemplated that the multi-rotor UAV would have more than four rotor arms. The embodiments shown herein have six rotor arms although even higher numbers of rotor arms and related rotor assemblies could also be used in the manufacture of a larger platform.

In some embodiments of the invention, the rotor arms would move independently between the folded position on the unfolded position. In other embodiments, the rotor arms might be coupled such that they all moved simultaneously between the folded position in the unfolded position. Bold such approaches are contemplated within the scope of the present invention.

The multi-rotor UAV of the present invention might also include a control system within the body which was operatively connected to the rotor assemblies, which may or may also include a power supply. Other additional embodiments might include landing gear integrated or attached to the body, or a payload integrated or attached to the body.

The present invention provides a multi-rotor UAV which has an attachment interface enabling the rotor arms to be folded into a very compact form in a closed position. It also provides an attachment interface which enables the rotor arms to be folded such that the extension of the rotor arms outside of the circumference of the body of the multi-rotor UAV is minimized when the multi-rotor UAV is in its folded or closed position.

The folding approach outlined herein for the plurality of rotor arms of a multi-rotor UAV also allows for the manufacture of a closable or foldable multi-rotor UAV with more than four rotor arms or four motors. This will allow for the manufacture of larger foldable multi-rotor UAVs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The invention comprises a multi-rotor UAV which has an unfolded operating position and a folded storage or transport position. The multi-rotor UAV of the present invention, when in its folded position, is collapsed further, with the rotor arms and rotor assemblies in closer proximity to the body and each other, than in prior art multi-rotor UAV configurations, yielding a better stored and transported unit that is less likely to sustain damage when in the folded position.

Referring first to FIG. 1 through FIG. 4, there is shown one exemplary embodiment of a multi-rotor UAV 100. The multi-rotor UAV 100 has a body 102. There are also a plurality of rotor arms extending radially from the body 102—in this case six rotor arms 106.1 through 106.6 are shown. The pivot end of each rotor arm 106 is pivotally attached to the body 102 via an attachment interface 120 at a rotor arm attachment point, such that the rotor arm 106 can be pivoted between the unfolded position extending radially outward from the body 102, and the folded position in which the rotor arm is folded inwardly towards the body 102 over top of an adjacent rotor arm to minimize the size of the multi-rotor UAV 100 in the folded position.

Figure 1:
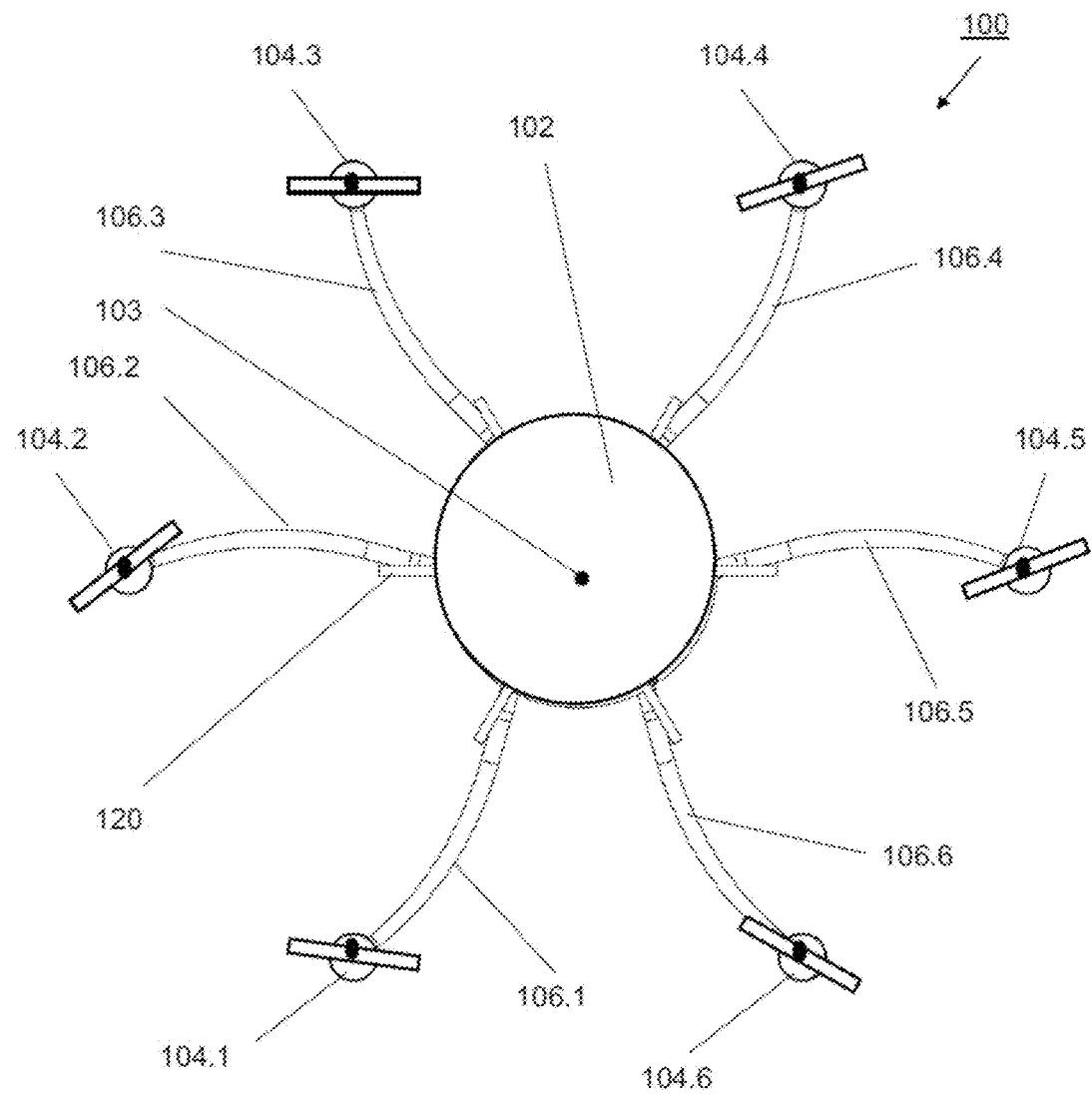
FIG. 1 is a simplified top view of one embodiment of a multi-rotor UAV in accordance with the present invention, with the plurality of rotor arms in the unfolded position.

In the embodiment of FIG. 1, six rotor arms are shown. It will be obvious to those skilled in the art however that the plurality of rotor arms could be more or less than six and could in certain embodiments either be an even or odd number of rotor arms, and that all changes to the number of rotor arms with attendant design changes in the overall aerodynamics or operation of the multi-rotor UAV without departing from the scope of the foldability of the unit as outlined herein is all contemplated within the scope of the present invention. The number of rotor arms could really be any number, including 4, 8, 10 or some other number of rotor arms.

The next element of the multi-rotor UAV of the present invention is a plurality of rotor assemblies 104 which are the rotary motors and propellers with control or power systems to allow for lifting and maneuvering of the multi-rotor UAV in operation. Each rotor assembly 104 corresponds to a rotor arm 106 and is attached to the outside end of its corresponding rotor arm 106.

In the embodiment of FIG. 1, six rotor assemblies 104.1 through 104.6 are shown, each connected to an outside end of a respective rotor arm 106.1 through 106.6. The rotor assemblies 104.1 through 104.6 each comprise, for example, a single rotor or coaxial rotor pairs driven by an electric motor. Using the six rotor assemblies 104.1 through 104.6 for creating lift, the multi-rotor multi-rotor UAV 100 is capable of performing the maneuvers a typical single rotor helicopter is capable of, yet does not require the mechanical complexity of the single rotor helicopter. In operation the multi-rotor UAV 100 is controlled by altering the rotation rate of one or more of the rotor assemblies to change torque and lift using an electronic control system disposed in the body 102 and electronic sensors connected thereto, with the control system and electronic sensors being implemented in a conventional manner known to one of ordinary skill in the art.

In the demonstrated embodiment the rotor arms 106.1 through 106.6 are positioned at regular intervals around a central vertical axis 103 of the body 102, with each rotor arm 106.1 through 106.6 positioning its respective rotor assembly 104.1 through 104.6 equi-distantly from the central vertical axis 103.

Preferably, the rotor arms 106.1 through 106.6 are hollow for accommodating wiring—connecting the rotor assemblies 104.1 through 104.6 to the electronic control system disposed in the main body 102. Typically, payload 114 such as, for example, a surveillance camera is mounted to the body 102 via support column 110 which also has mounted thereto landing gear 112.

Figure 2:
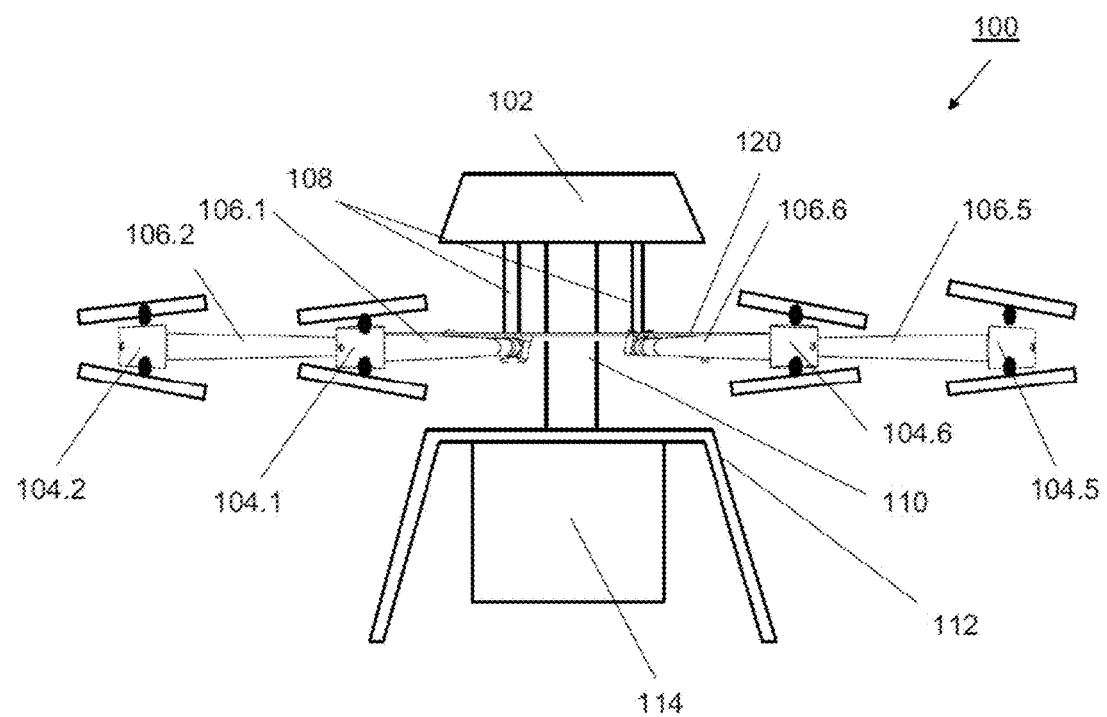
FIG. 2 is a side view of the embodiment of FIG. 1.
Figure 3:
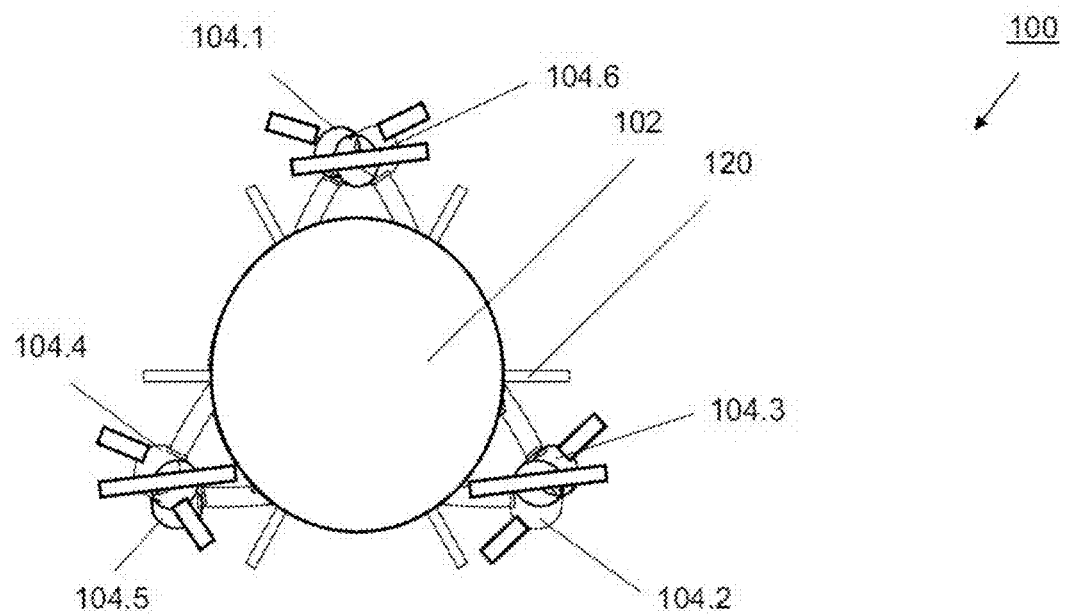
FIG. 3 is a top view of the embodiment of FIG. 1, with the multi-rotor UAV and the plurality of rotor arms being in the folded position.
Figure 4:
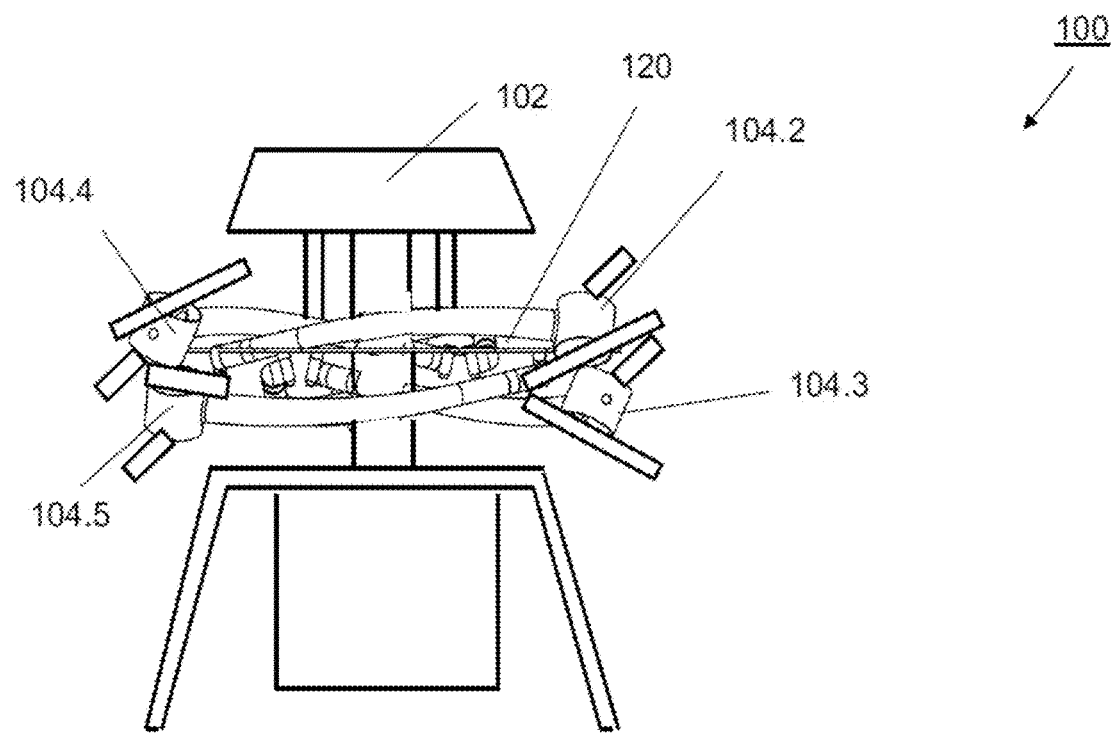
FIG. 4 is a side view of the embodiment of FIG. 1, with the multi-rotor UAV and the plurality of rotor arms being in the folded position.

The attachment interface 120 provides the planar attachment location for the attachment of the plurality of rotor arms and their related rotor assemblies to the body. Each of the rotor arms 106.1 through 106.6 is pivotally attached to the attachment interface 120, for pivoting the rotor arms 106.1 through 106.6 from the unfolded position, where the rotor arms extend radially outward from the body such that the rotor assemblies 104.1 through 104.6 are spaced in a predetermined operating configuration as illustrated in FIG. 1 and FIG. 2, to a folded position where, compared to the unfolded position, the extension of the rotor arms 106.1 through 106.6 from the body 102 is substantially reduced, as illustrated in FIG. 3 and FIG. 4. The attachment interface equates to a folding mechanism which allows for the attachment of the rotor arms to the body of the multi-rotor UAV.

The attachment interface 120 is connected to the body 102 via, for example, connecting columns 108 having a predetermined length for providing sufficient space between the same and the bottom of the body 102 for folding/unfolding the rotor arms 106.1 to 106.6.

Folding of the rotor arms 106.1 through 106.6 into a substantially compact form in the folded position as, for example, illustrated in FIG. 3 and FIG. 4, is possible by pivoting the rotor arms 106 such that an outer arm portion of each rotor arm 106.1 through 106.6 is enabled to cross the pivot end and an inner arm portion of an adjacent rotor arm 106.1 through 106.6, as will be disclosed in more detail below.

FIG. 5 through FIG. 14 illustrate each of three positions—unfolded position, intermediate position, and folded position—of the rotor arms in a top view, a side view, and a perspective top view, respectively. As will be evident to one skilled in the art, the rotor arms 106.1 through 106.6 are folded into the folded position by pivoting them around their pivot ends at their respective rotor arm attachment point towards the body, and over the pivot end and an inner arm portion of an adjacent rotor arm to an inward folded position, and can be moved into the extended unfolded position by simply reversing the folding process.

Figure 5:
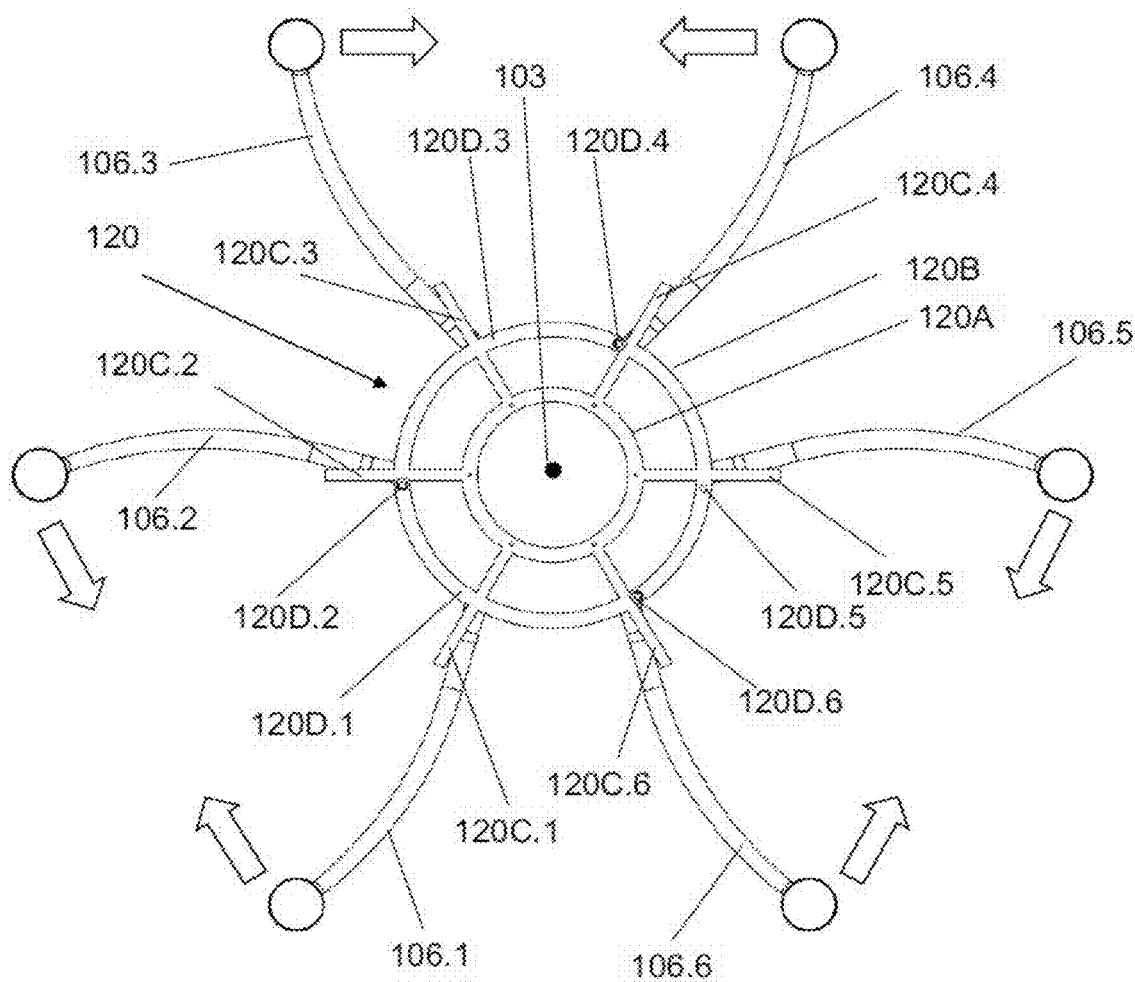
FIG. 5 is a simplified top view of an embodiment of an attachment interface and the multi-rotor UAV, with the rotor arms in the unfolded position.

In the embodiment of FIG. 5 the attachment interface 120 has a plurality of rotor arm attachment points spaced therearound, corresponding to the plurality of rotor arms. Each of the rotor arms 106.1 through 106.6 is pivotally attached to the attachment interface by pivotal or hinged attachment of its pivot end to a rotor arm attachment point of the attachment interface. The rotor arm attachment points are shown at 120D.1 through 120D.6.

Figure 6:
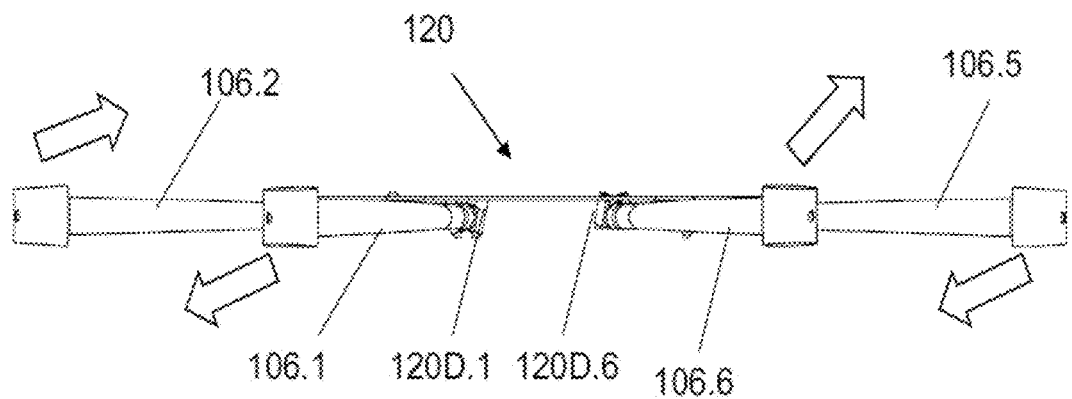
FIG. 6 is a side view of the embodiment of FIG. 5.
Figure 7:
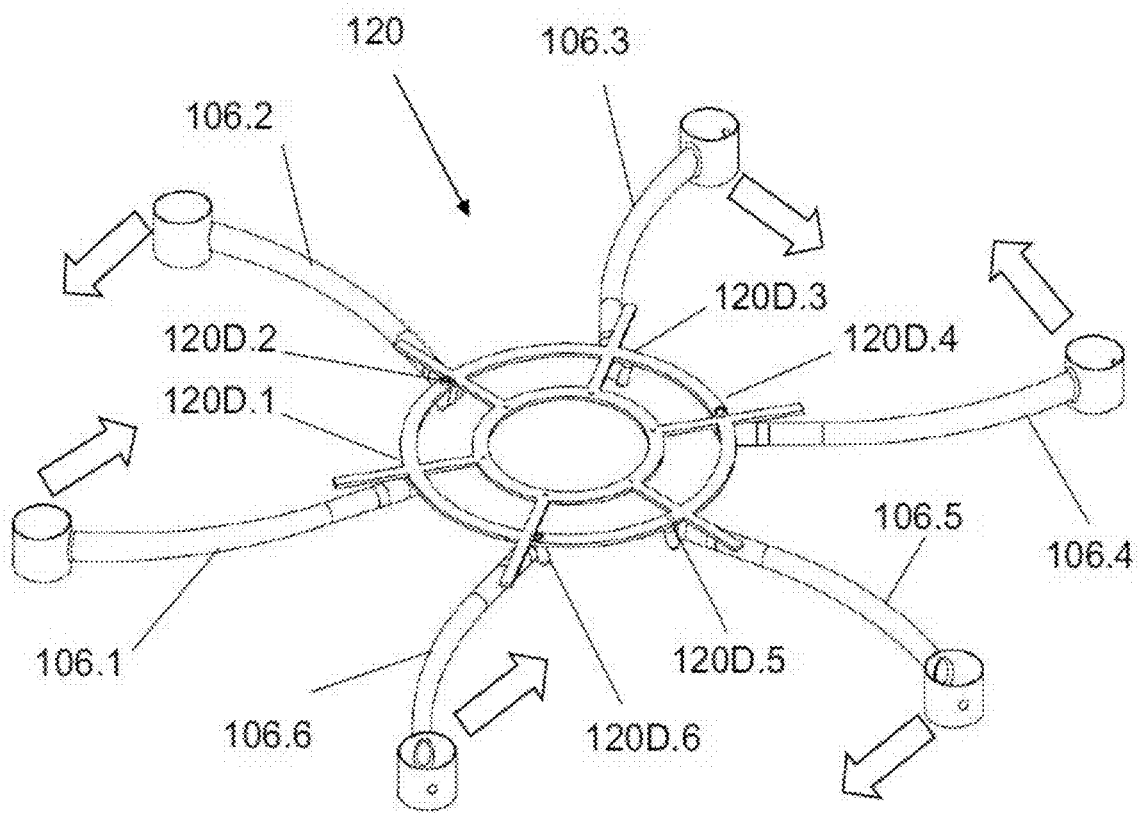
FIG. 7 is a top perspective view of the embodiment of FIG. 5.

In the unfolded position, the rotor arms 106.1 through 106.6 extend radially outward from the body 103 and the attachment interface 120, as illustrated in FIG. 5 to FIG. 7. Initially, the outside ends of the rotor arms 106.1 through 106.6 are moved towards each other in rotor arm pairs—106.1 & 106.2; 106.3 & 106.4; and 106.5 & 106.6—with the odd rotor arms 106.1, 106.3, and 106.5 being moved, by virtue of their specific pivotal attachment to the body, downwardly and the even rotor arms 106.2, 106.4, and 106.6 being moved upwardly, as indicated by the block arrows in FIG. 5 through FIG. 7.

Figure 8:
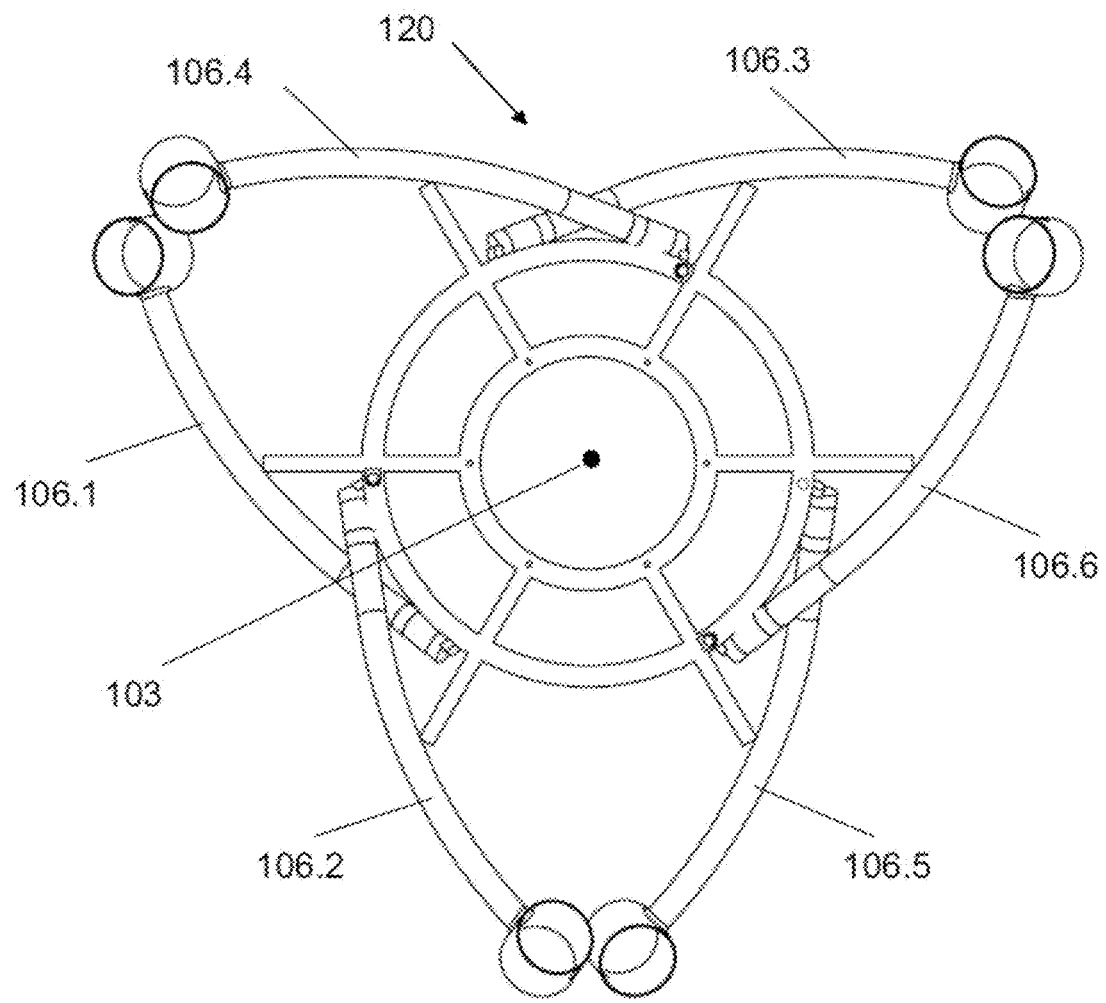
FIG. 8 is a simplified top view of the embodiment of FIG. 5, with the rotor arms in an intermediate position.
Figure 9:
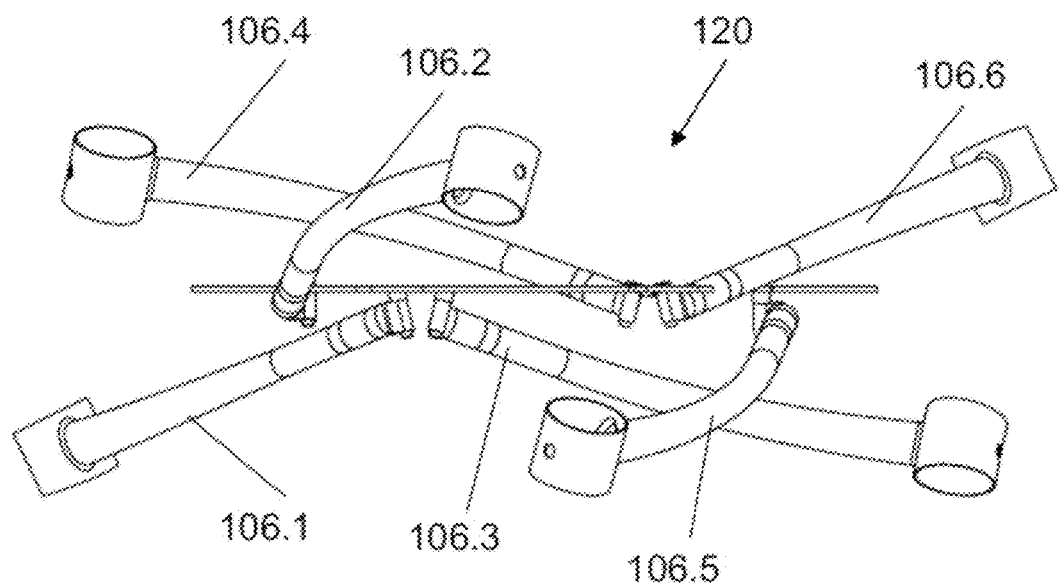
FIG. 9 is a side view of the embodiment of FIG. 8.
Figure 10:
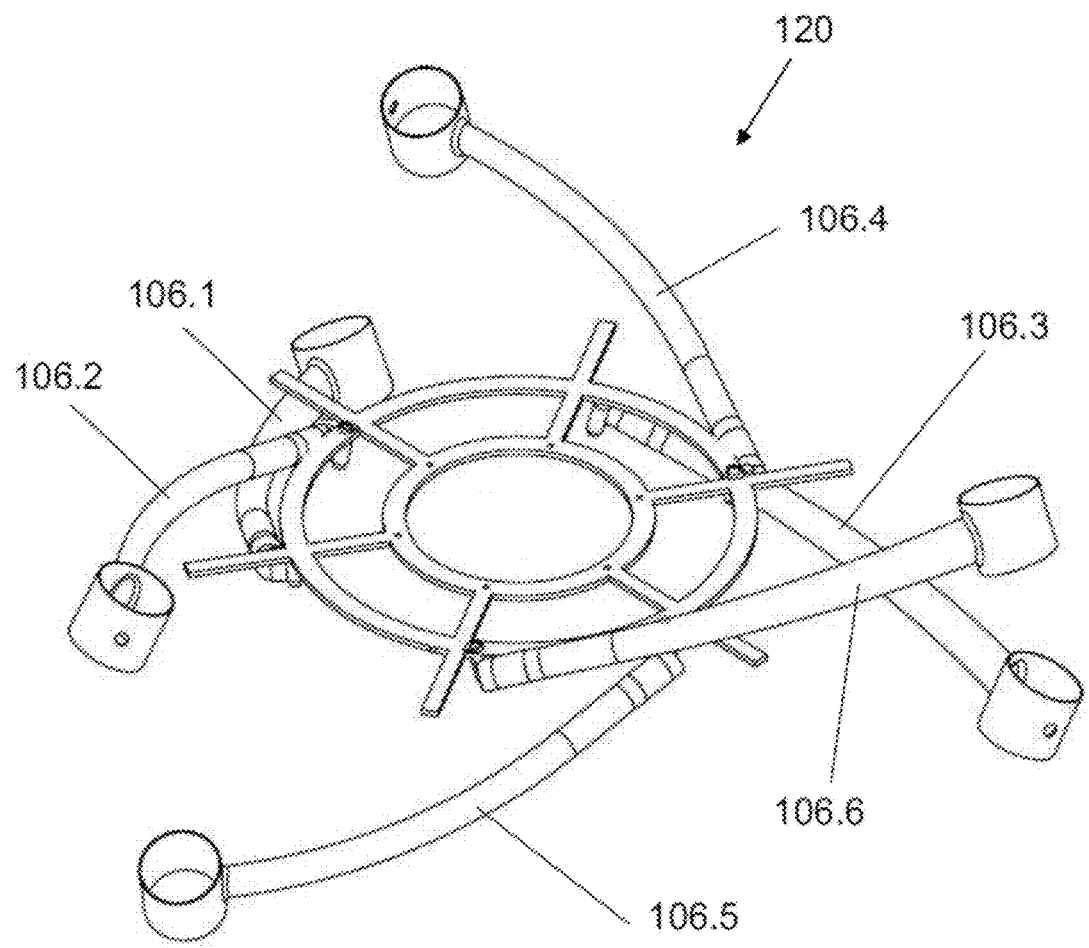
FIG. 10 is a perspective top view of the embodiment of FIG. 8.
Figure 11:
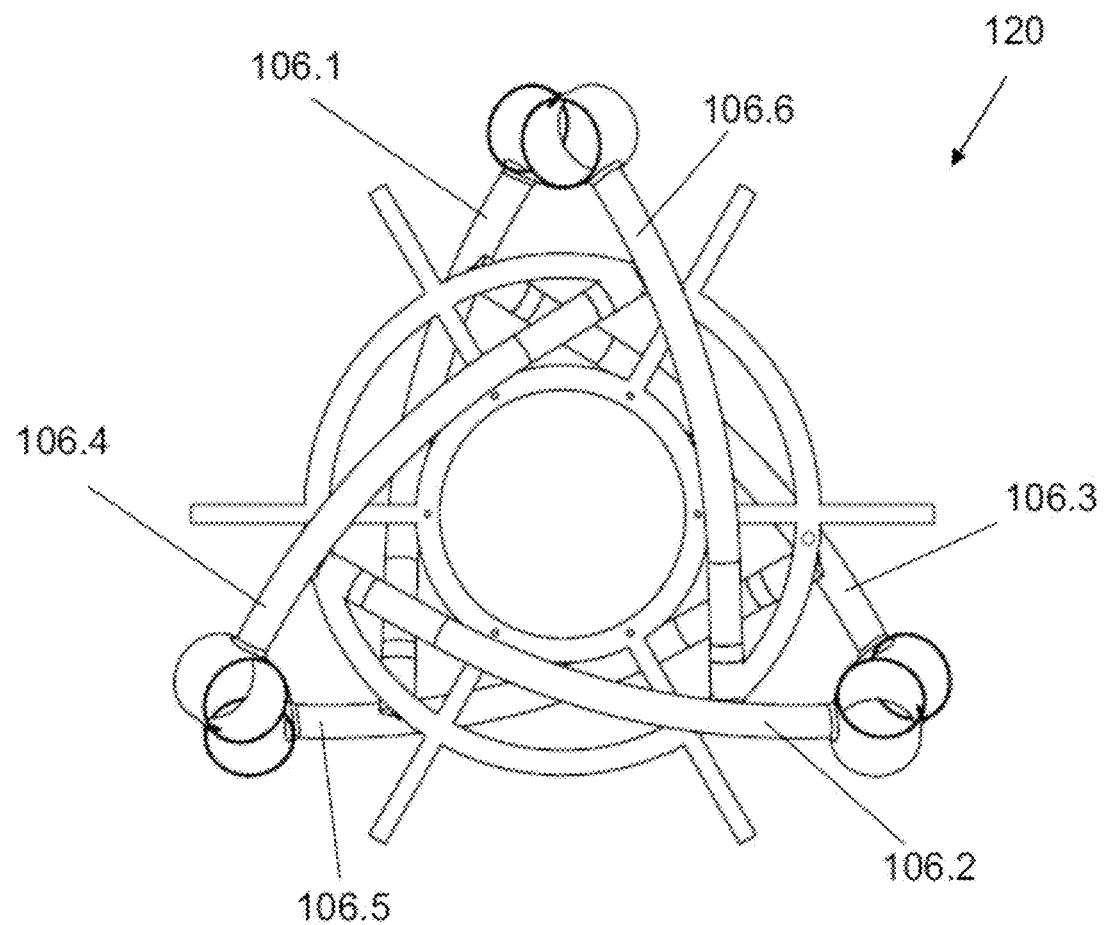
FIG. 11 is a simplified top view of the embodiment of FIG. 5, with the rotor arms in the folded position.
Figure 12:
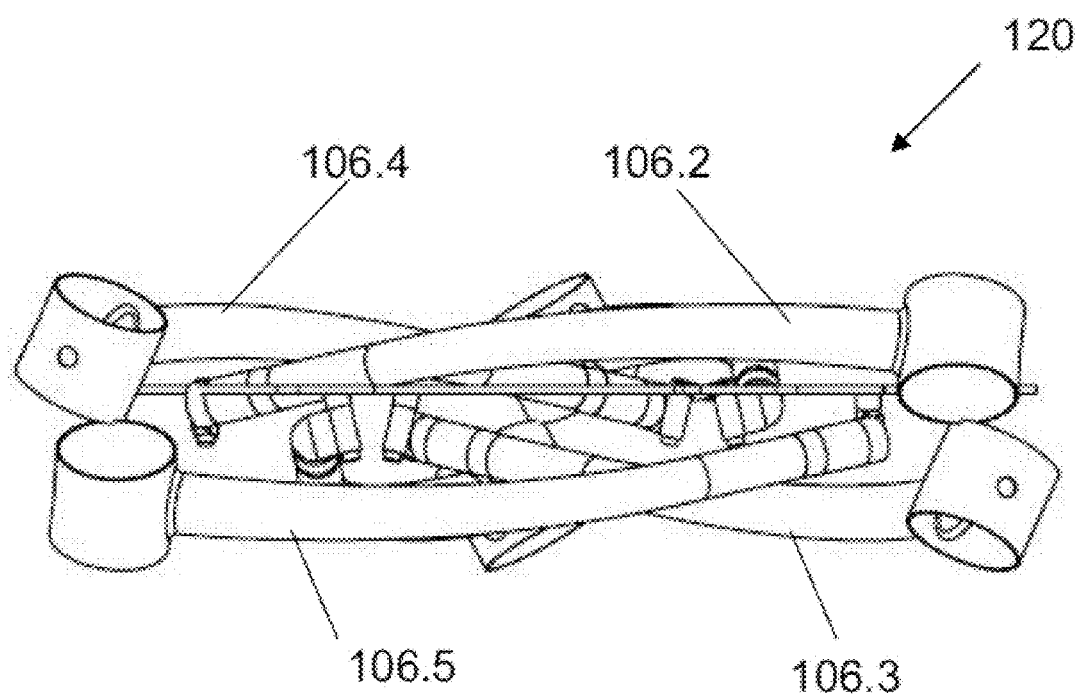
FIG. 12 is a side view of the embodiment of FIG. 11.
Figure 13:
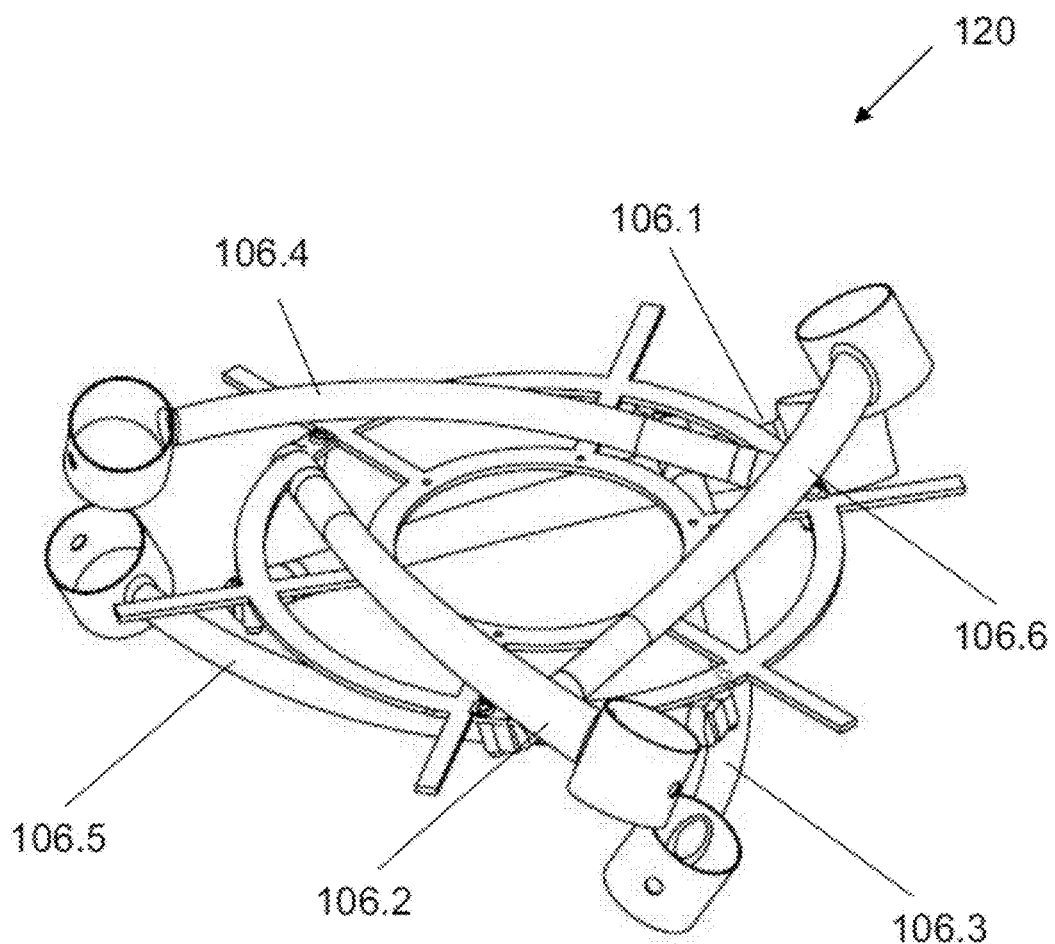
FIG. 13 is a top perspective view of the embodiment of FIG. 11.

The upward and downward movement in relation to a plane extending through body and the pivot ends during and by virtue of the specific pivotal mount of each rotor arm to the attachment interface allows the adjacent rotor arm pairs to cross each other while moving the outside end of each of the rotor arms inwardly towards the central vertical axis 103, as illustrated in FIG. 8 through FIG. 10, in a tighter overlapping pattern. In continuation, this movement allows the rotor arms of each of the rotor arm pairs to cross each other's pivot end and an outer arm portion until the folded position is reached, as illustrated in FIG. 11 through FIG. 13.

In the embodiment shown in these Figures, the attachment interface 120 comprises two concentric flat rings—an inner ring 120A and an outer ring 120B disposed in a plane perpendicular to the central vertical axis 103, as illustrated in FIG. 5. A plurality of spokes 120C. 1 to 120C.6 corresponding to the number of rotor arms connect the inner ring 120A and outer ring 120B and extend beyond the outside perimeter of the outer ring 120B a predetermined distance for securing the rotor arms 106.1 to 106.6 in the unfolded position. This structure provides sufficient strength while substantially minimizing weight. Of course, other shapes such as, for example, a single wide ring having spokes protruding the perimeter may be employed.

Figure 14:
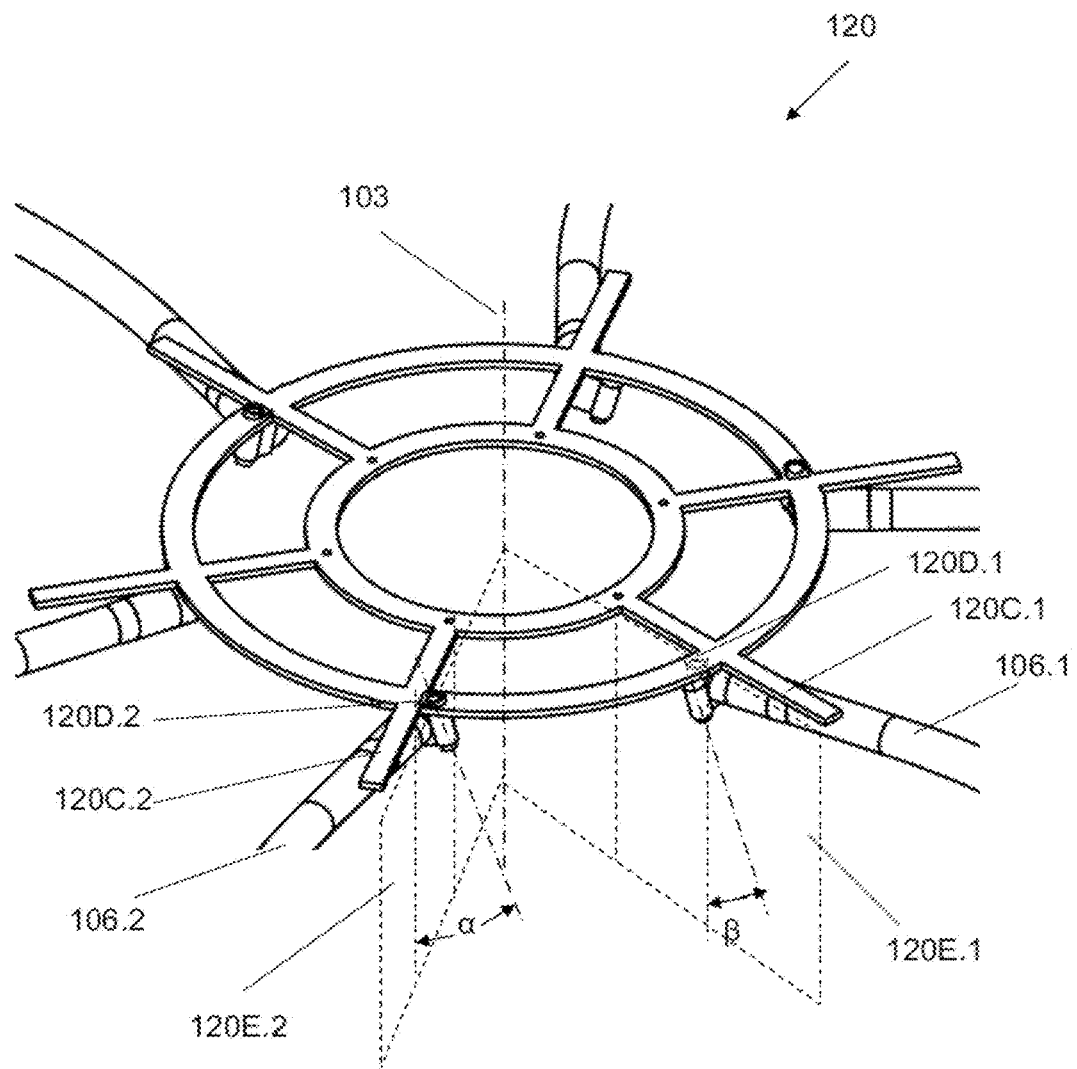
FIG. 14 is a simplified top perspective view of an embodiment of a multi-rotor UAV in accordance herewith, demonstrating the pivotal attachment of the rotor arms at their pivot end to the body.
Figure 15:
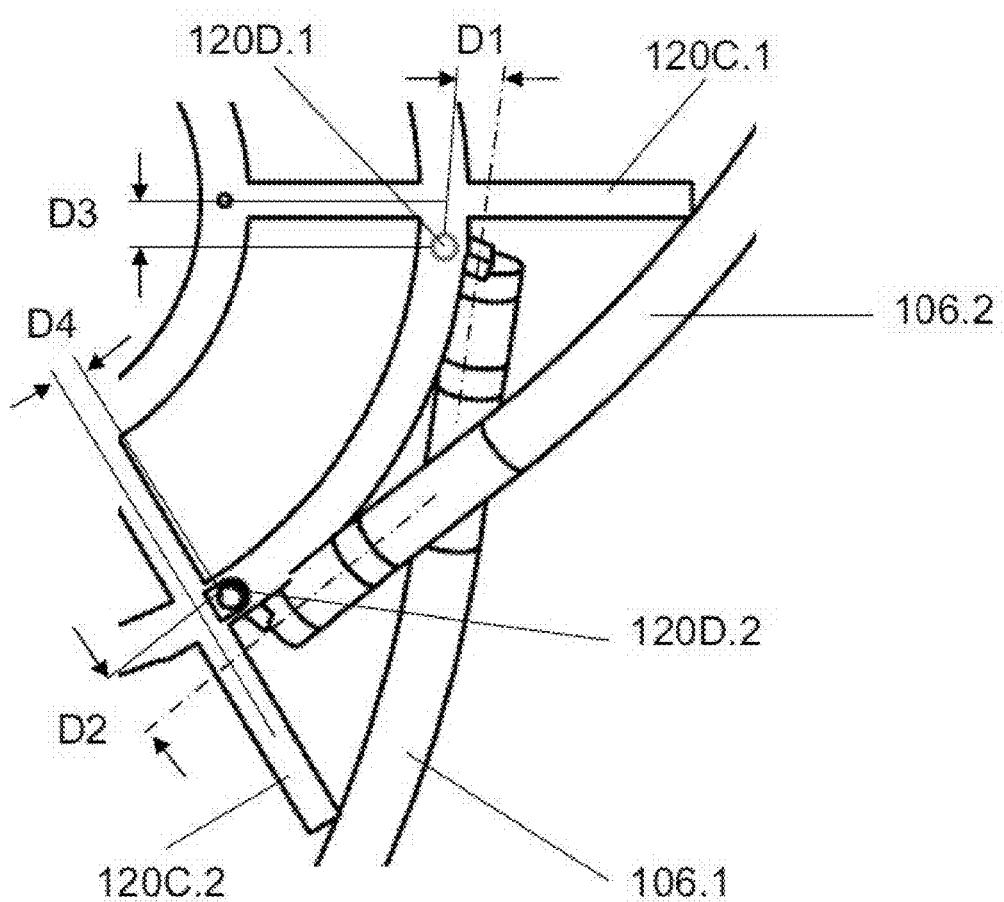
FIG. 15 is a top view of a detail portion of FIG. 14.
Figure 16:
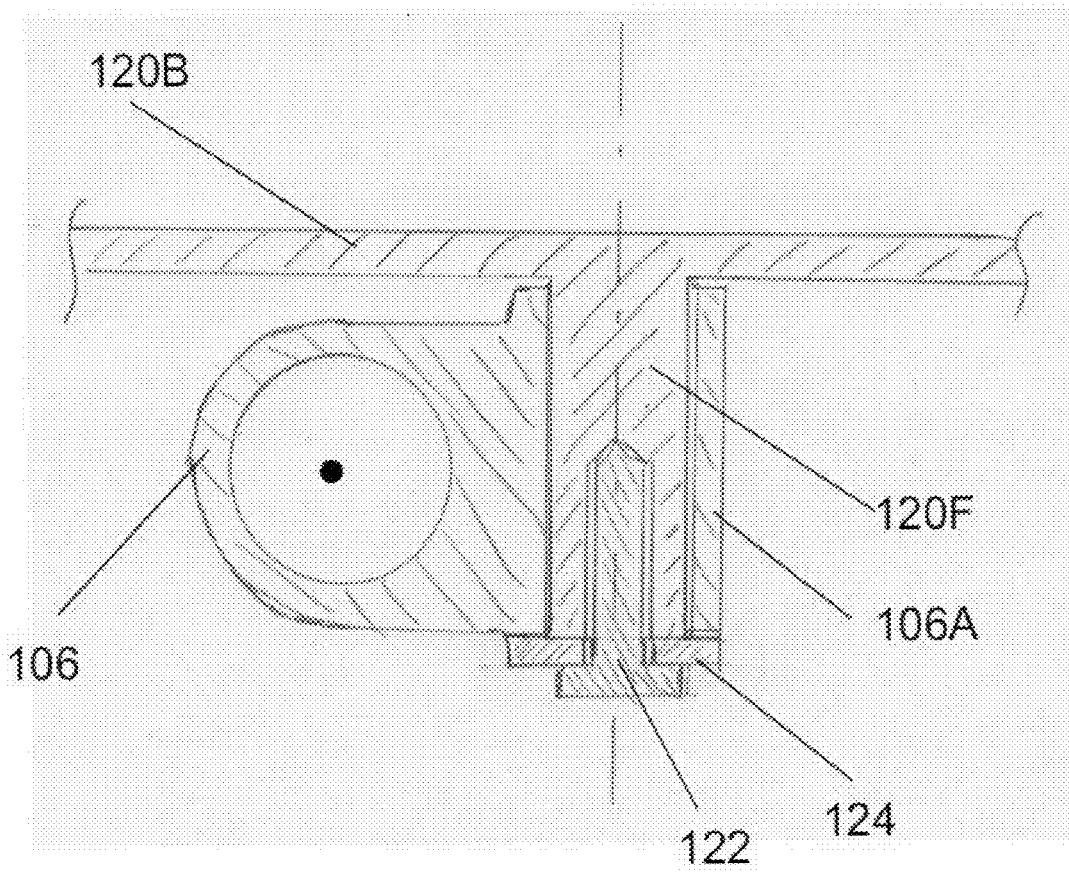
FIG. 16 is a cross-sectional view of the pivot end attachment of a rotor arm to the body shown in FIG. 14.

The rotor arm attachment points 120D of the odd rotor arms 106 are placed a predetermined distance D3 to the left of the intersection of the respective spoke 120C on the outer ring 120B, while the rotor arm attachment points 120D of the even rotor arms 106 are placed a predetermined distance D4 to the right of the intersection of the respective spoke 120C on the outer ring 120B, as illustrated in FIG. 14 and FIG. 15. The axes of the rotor arm attachment points 120D are angled a predetermined angle—α for even rotor arms 106 and β for odd rotor arms 106—with respect to a plane 120E through the central vertical axis 103 in order to enable the upward/downward movement of the rotor arms 106. Alternatively, the axes of the rotor arm attachment points 120D may be angled with respect to a plane oriented perpendicular to the plane 120E or with respect to both planes. Furthermore, the axes of the rotor arm attachment points 120D are offset a predetermined distance—D1 for odd rotor arms 106 and D2 for even rotor arms 106—from the central vertical axis of the respective rotor arm 106, as illustrated in FIG. 16. The distances D1-D4 are determined in dependence upon the size and geometry of the attachment interface 120A-120C and the arms 106 as well as the space available for folding the arms 106. Preferably, the angles α and β are in the range between 5° and 25°. It is noted that the angles α and β may be the same.

The rotor arms 106 are attached at the rotor arm attachment points 120D in a standard, for example, hinge type fashion, as illustrated in FIG. 16. For example, pin type protrusions 120F are accommodated in a bore of the barrel section 106A of the respective rotor arm 106. The rotor arm 106 is then secured to the attachment interface 120 at the rotor arm attachment point via screw 122 and washer 124. The attachment interface 120 comprising the pin type protrusions 120F is, for example, made as a single unit from carbon fiber material using standard manufacturing techniques. Alternatively, the pins 120F are mounted to the remainder of the attachment interface 120 in a standard fashion. The rotor arms 106 comprising the barrel section 106A are, for example, made as a single unit from carbon fiber material or suitable plastic material using standard manufacturing techniques. Alternatively, the barrel section 106A is mounted to the rotor arm 106 in a conventional manner. Further alternatively, the rotor arms 106 are made of another light weight material such as, for example, wood or aluminum.

Figure 17:
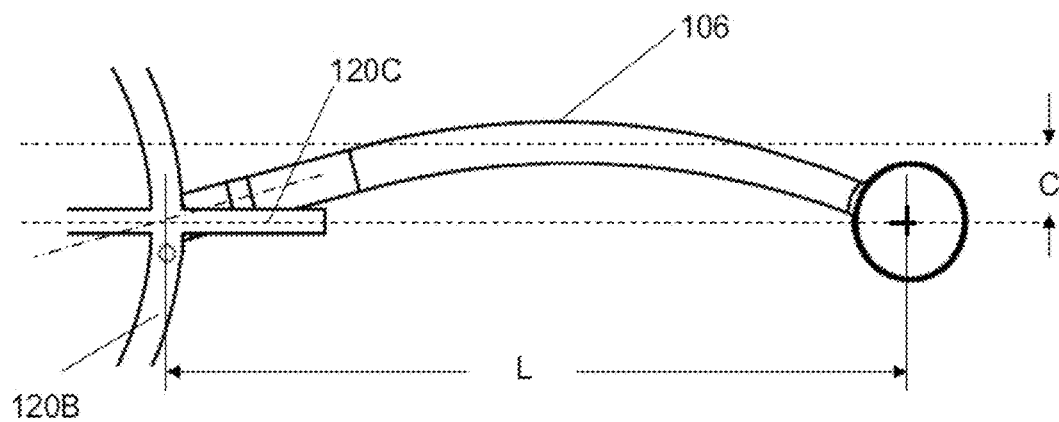
FIG. 17 is a simplified top view of a rotor arm of the attachment interface of the multi-rotor UAV according to a preferred embodiment of the invention.

Preferably, the rotor arms 106 are curved in order to reduce the space needed for the folding process as well as for reducing the space used in the folded position, as illustrated in FIG. 17. Camber C is determined in dependence upon the size and geometry of the attachment interface components 120A, 120B, 120C and the length L of the rotor arms 106 as well as the space available for folding the rotor arms 106. Alternatively, straight rotor arms 106 are employed at the cost of a greater space needed for the folding process and a greater extension of the rotor arms 106 from the body 102 in the folded position.

Figure 18:
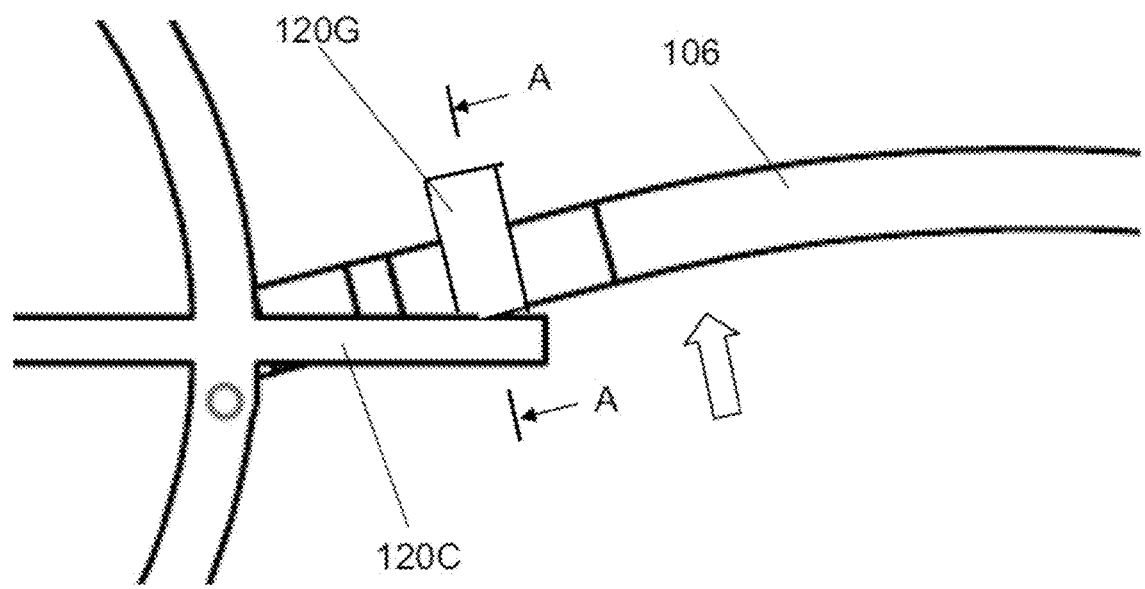
FIG. 18 is a simplified top view of a securing mechanism of the attachment interface of the multi-rotor UAV according to a preferred embodiment of the invention.
Figure 19:
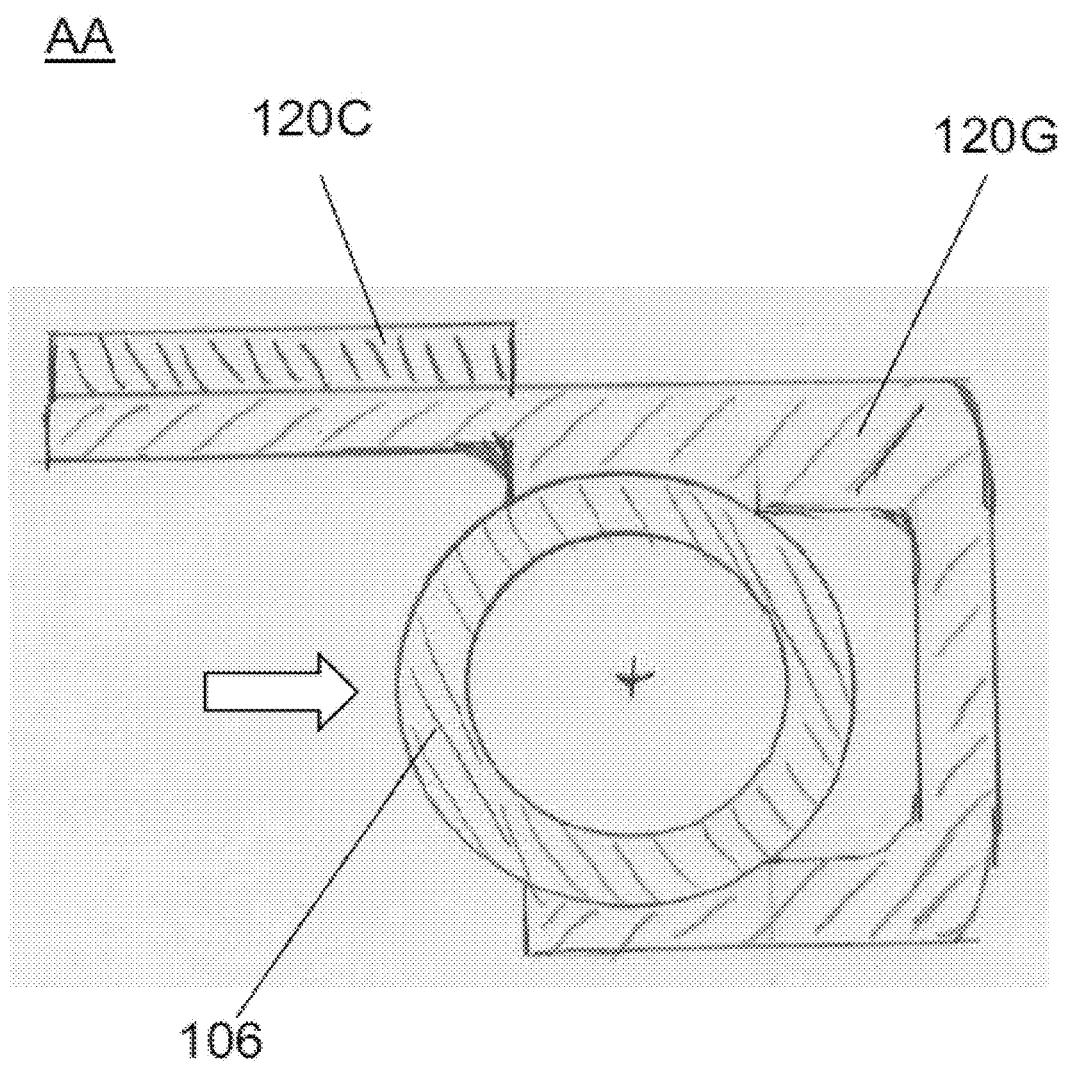
FIG. 19 is a simplified cross-sectional view of the securing mechanism of FIG. 18.

Preferably, the rotor arms 106 are secured in the unfolded position using clips 120G fastened to the respective spoke 120C in a conventional manner using, for example, an adhesive, as illustrated in FIG. 18 and FIG. 19. The clips 120G are made of a resilient material such as, for example, a plastic material or a strip of metal sheet material and comprise upper and lower clip legs. When the rotor arm 106 contacts the clip 120G the lower clip leg is forced downward such that the rotor arm 106 can move into the upper and lower grooves disposed in the respective upper and lower clip legs. After insertion the clip legs move together and maintain the rotor arm 106 in the grooves. The clips 120G are oriented such that when the arms 106 are engaged the rotor assemblies 104 are placed at their predetermined position.

The hinged attachment of the rotor arms 106 to the attachment interface 120 enables the rotor arms 106 to be folded such that an extension of the rotor arms 106 from the body 102 is substantially reduced, for example, from a distance of 5 feet from the central vertical axis 103 to a distance of 1.5 feet to 2 feet. Furthermore, the attachment interface 120 enables more than 4 rotor arms 106 to be folded into a substantially compact form.

Figure 24:
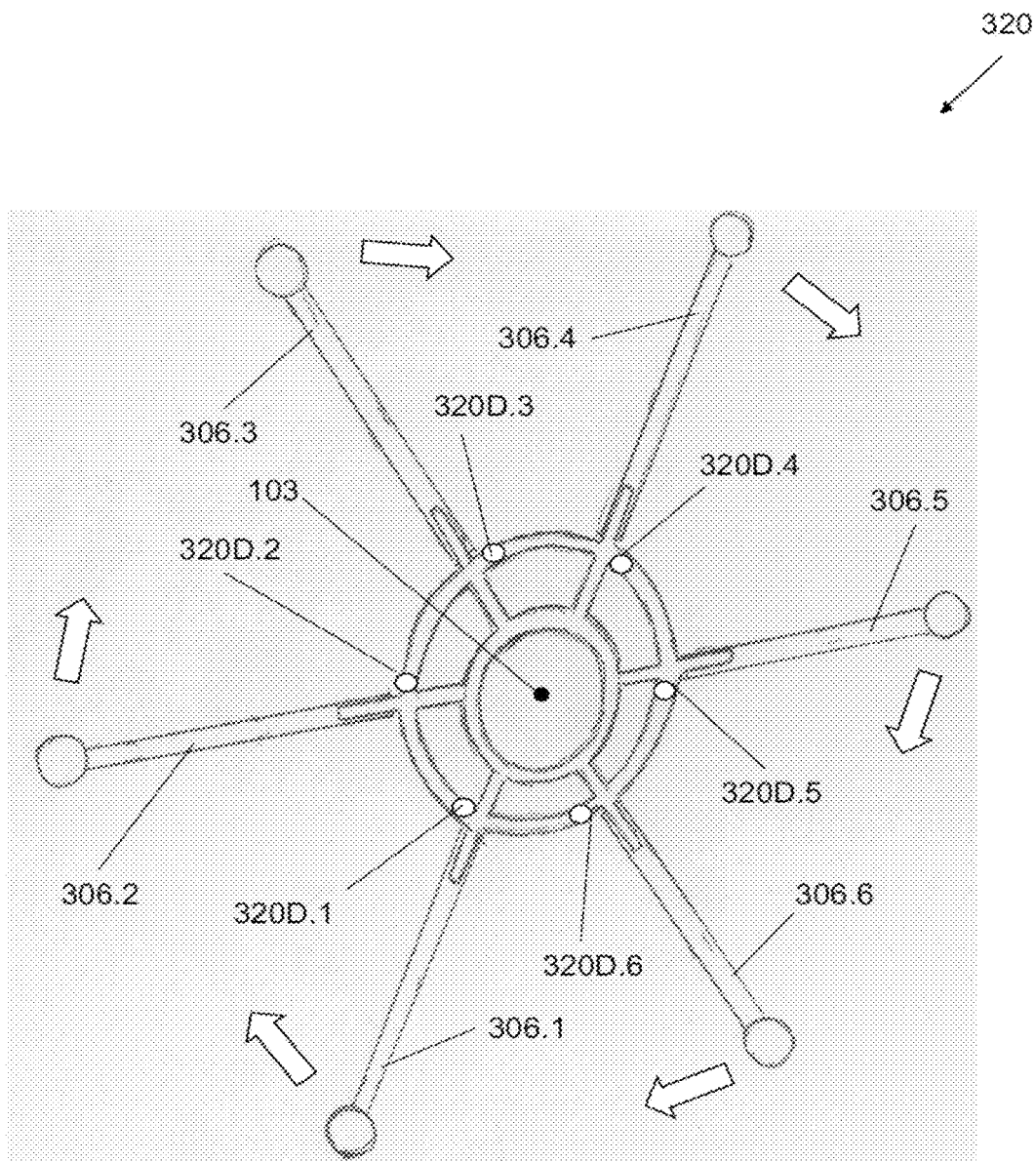
FIG. 24 is a simplified top view of another embodiment of an attachment interface of a multi-rotor UAV in accordance with the present invention, wherein the rotor arms are in the unfolded position.

FIG. 20 to FIG. 23 illustrate the three stages—unfolded, intermediate, and folded—of another embodiment of a multi-rotor UAV 100 in accordance with the present invention, with an attachment interface 220 configured to allow for the folding of the plurality of rotor arms in accordance with the present invention but in a different way. FIG. 24 illustrates the intermediate stage in a side view.

Figure 20:
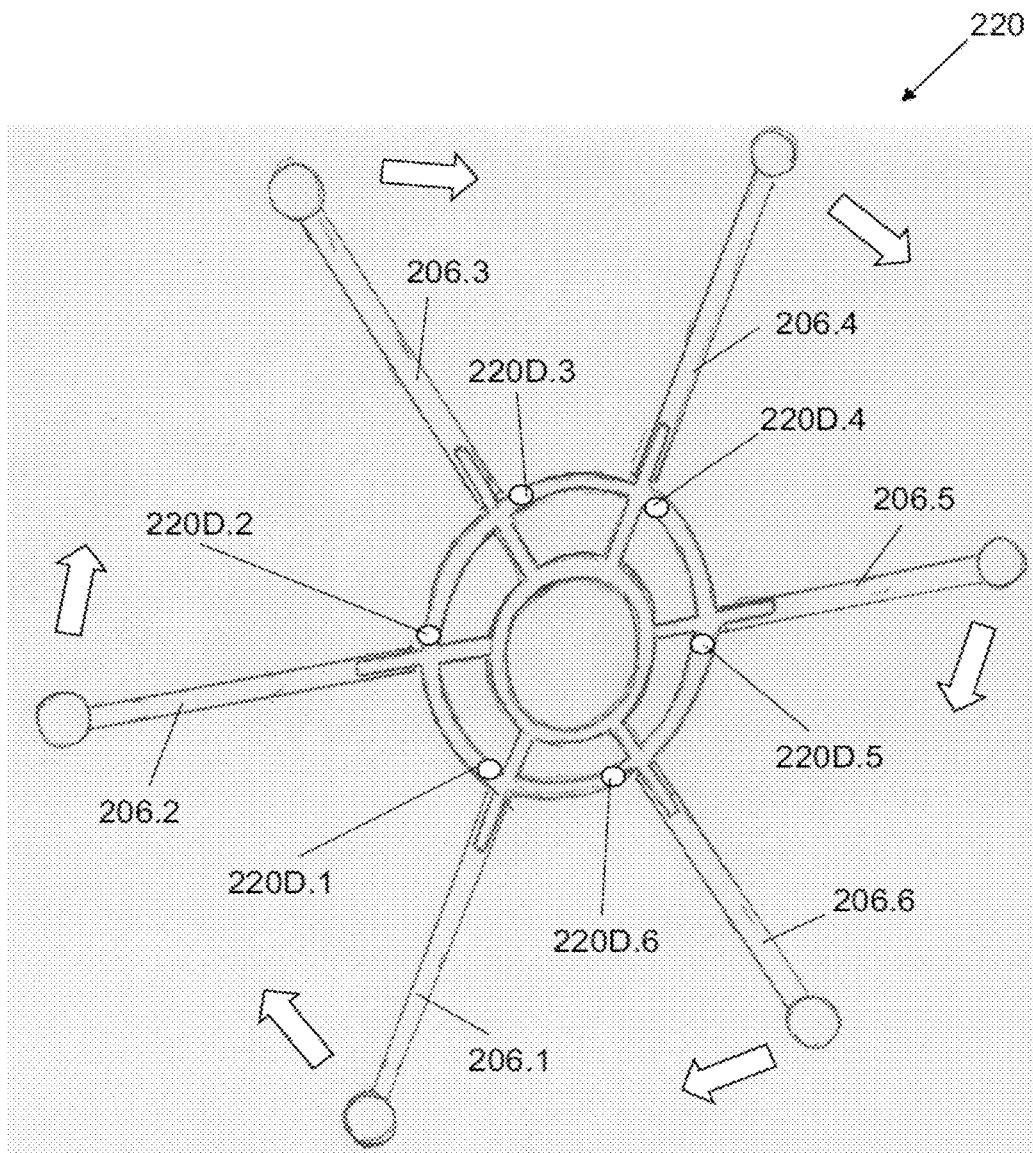
FIG. 20 is a simplified top view of an attachment interface of a multi-rotor UAV in accordance with the present invention, wherein the rotor arms are in the unfolded position.
Figure 21:
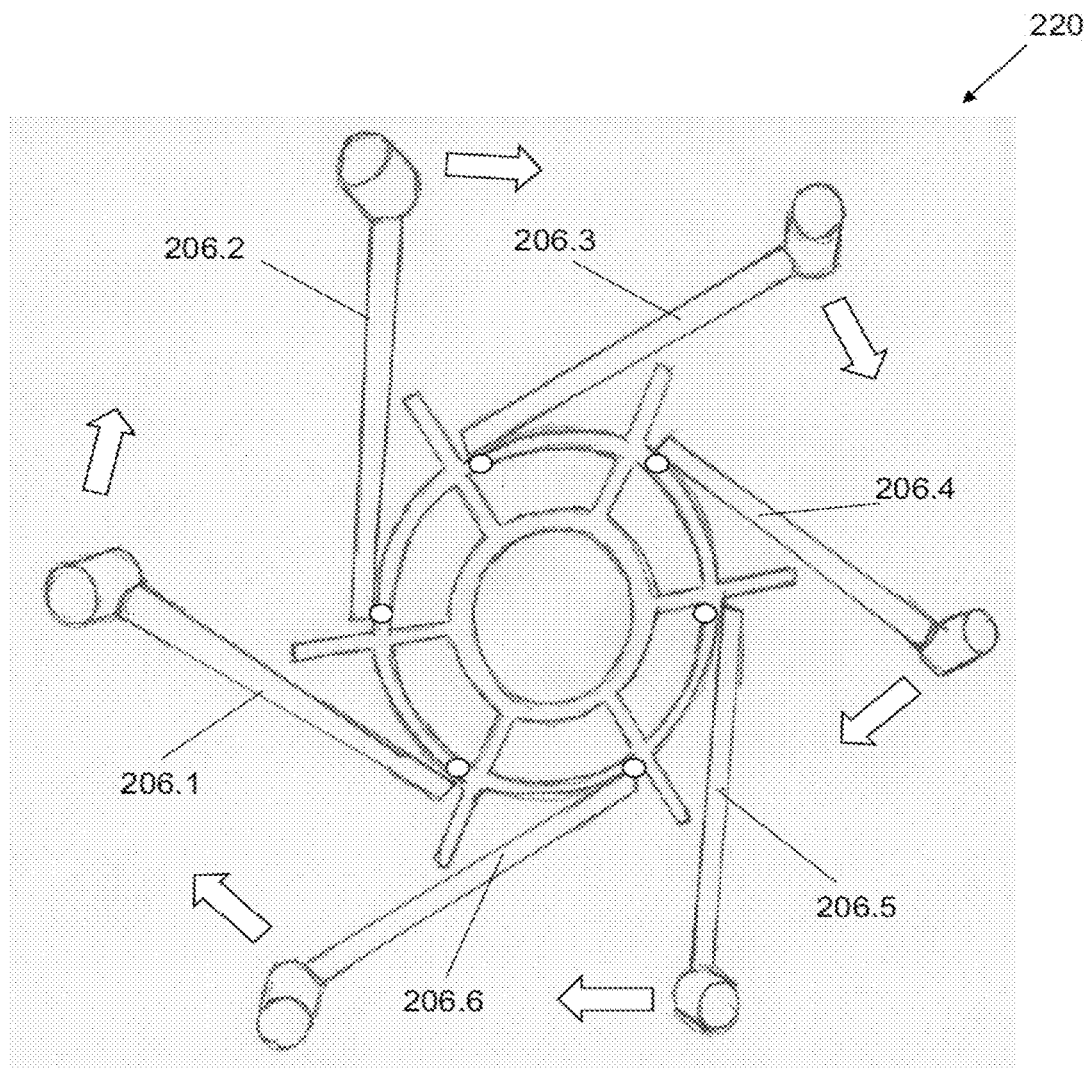
FIG. 21 is a simplified top view of the embodiment of FIG. 20, wherein the rotor arms are in intermediate position between the folded position and the unfolded position.
Figure 22:
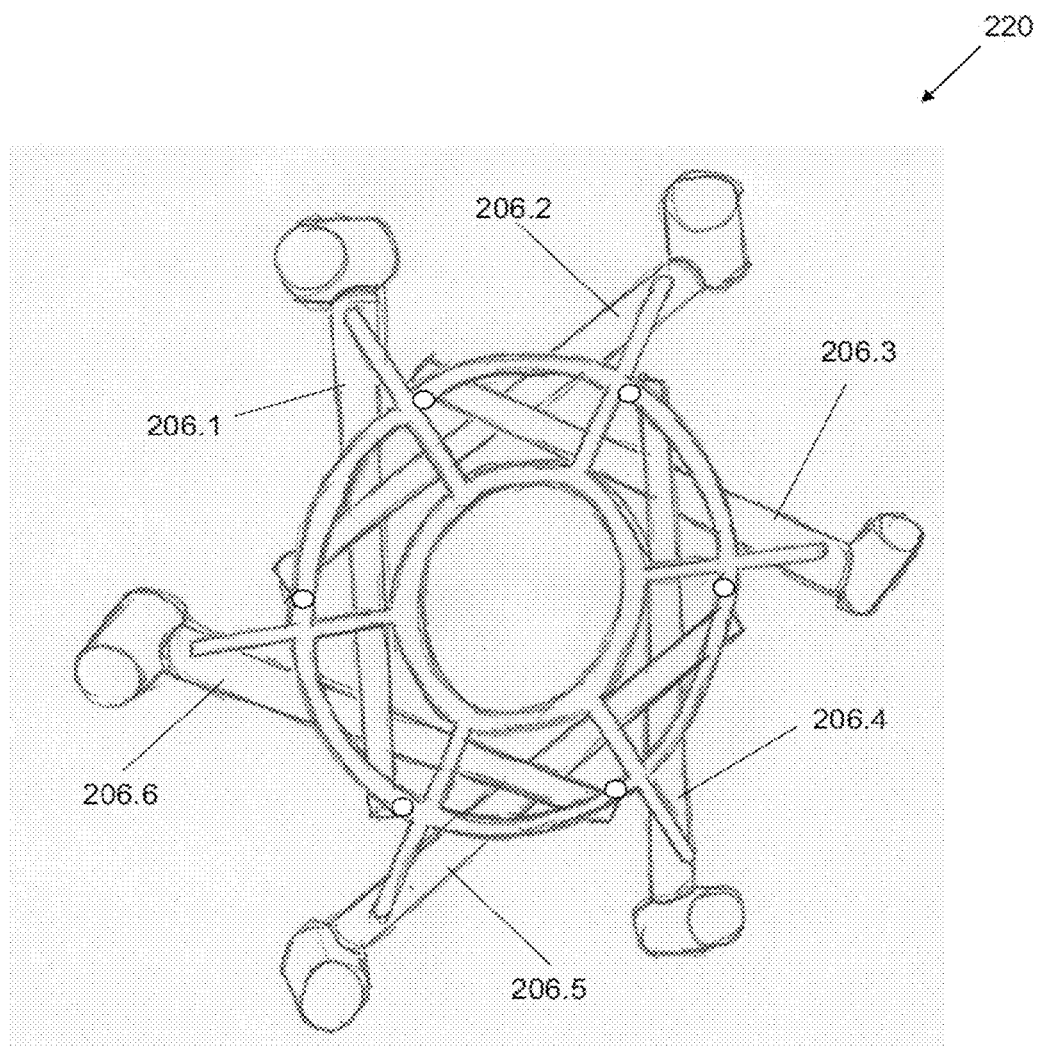
FIG. 22 is a simplified top view of the embodiment of FIG. 20, wherein the rotor arms are in the folded position.
Figure 23:
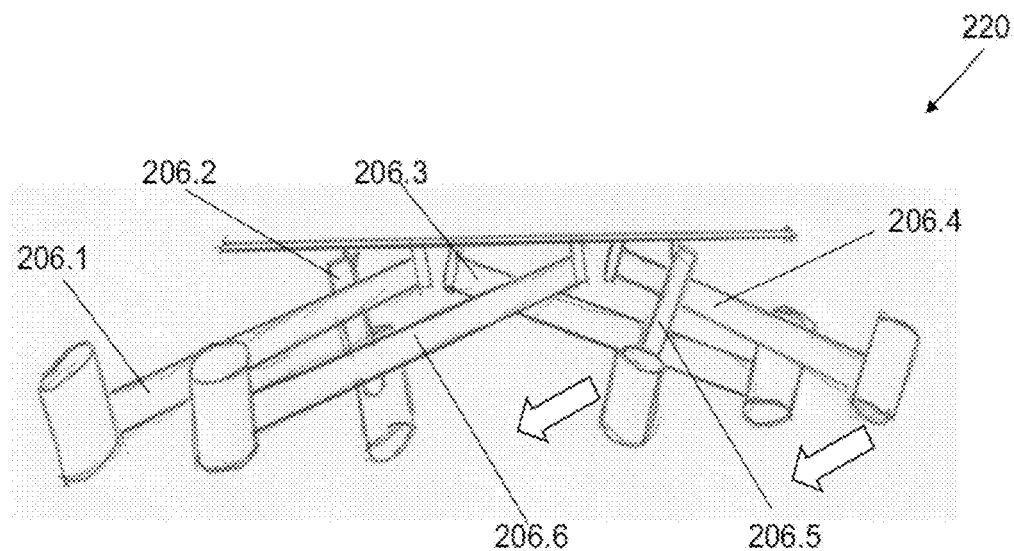
FIG. 23 is a simplified side view of the embodiment of FIG. 22.

In this embodiment, six rotor arms are shown 206.1 through 206.6. Each rotor arm 206 is pivotally mounted at its pivot end to the attachment interface via respective rotor arm attachment points 220D. 1 through 220D.6, similar to the one described hereinabove. In the unfolded position the rotor arms 206.1 to 206.6 extend radially outward from the body and the attachment interface, as illustrated in FIG. 20.

In this embodiment the rotor arms 206.1 to 206.6 are rotated about their respective rotor arm attachment points 220D.1 to 220D.6 in a same, for example, clockwise, direction, as indicated by the block arrows in FIGS. 3a and 3b. While being rotated the rotor arms 206.1 to 206.6 are moved downwardly, as indicated by the block arrows in FIG. 23. The downward movement allows an outer arm portion of each of the rotor arms 206.1 through 206.6 to cross the pivot end and an inner arm portion of one adjacent rotor arm, i.e. the following rotor arm in clockwise direction, to reach the folded position illustrated in FIG. 22.

The rotor arm attachment points 220D of the rotor arms 206 are placed and oriented similar to the rotor arm attachment points 120D of the odd numbered arms 106 in the embodiments of FIG. 1 through FIG. 19 described hereinabove for enabling the downward movement while being rotated. The attachment interface, the rotor arm attachment points 220D and the rotor arms 206 are implemented in a similar fashion as disclosed hereinabove. Since all the rotor arms 206.1 through 206.6 are deflected downward on folding, the attachment interface 220 can be directly mounted to the body 102, obviating the connecting columns 108 at the cost of a greater extension of the rotor arms 206 from the body 102 in the folded position. Furthermore, since all rotor arms 206 are mounted and moved in a same fashion, the attachment interface 220 is implementable for even as well as odd numbers of arms 206.

Figure 25:
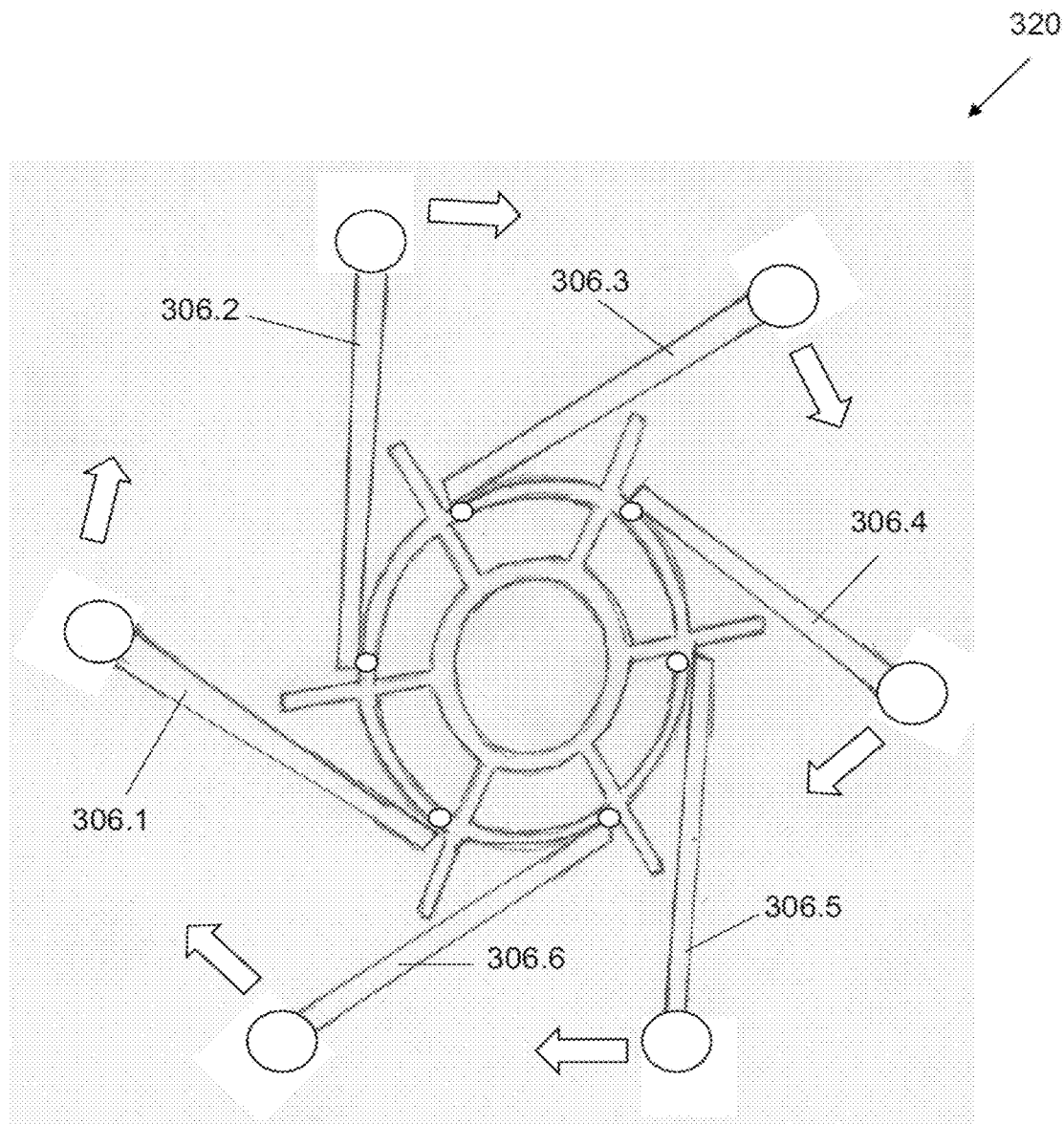
FIG. 25 is a simplified top view of the embodiment of FIG. 24, wherein the rotor arms are in intermediate position between the folded position and the unfolded position.
Figure 26:
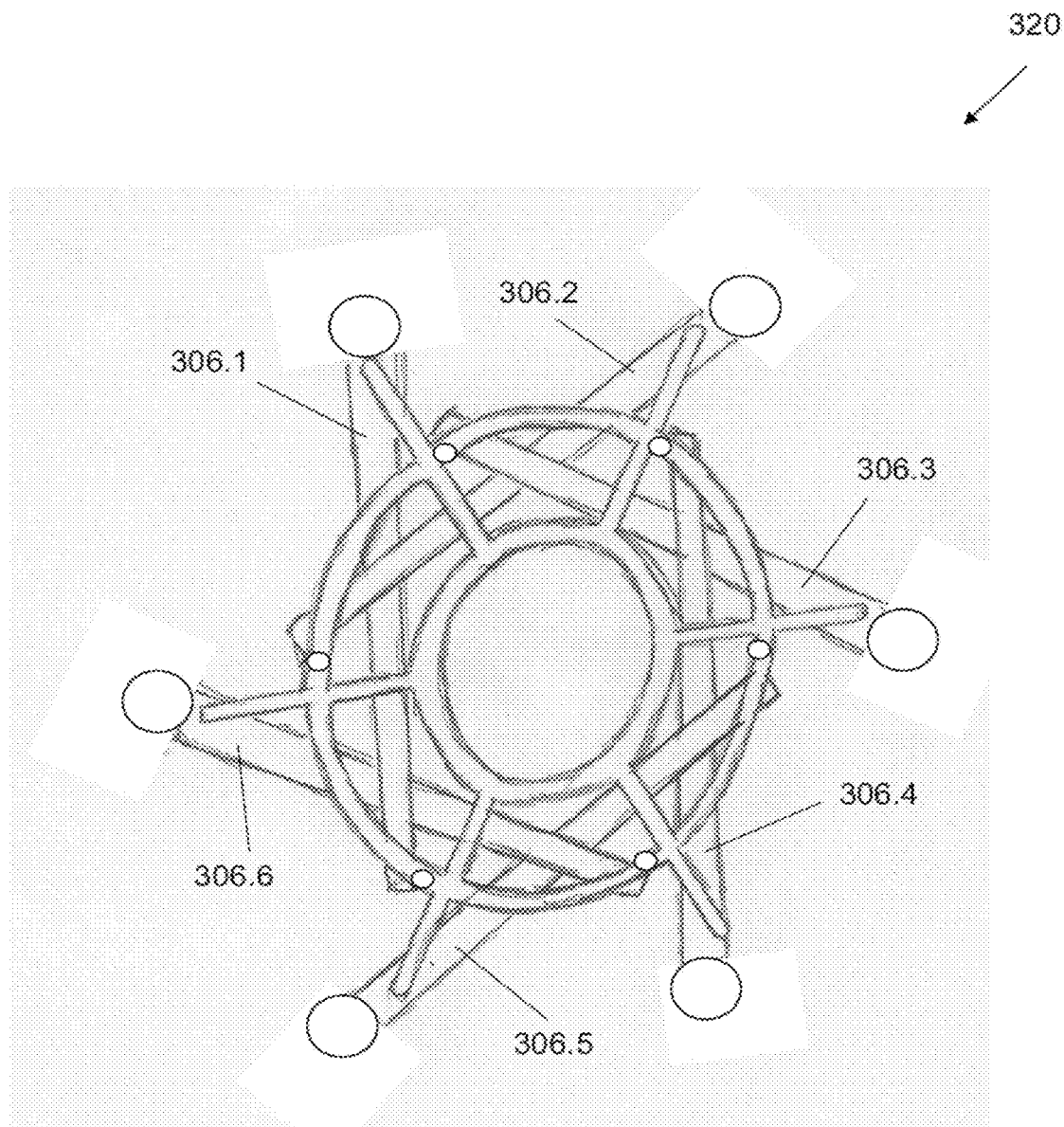
FIG. 26 is a simplified top view of the embodiment of FIG. 24, wherein the rotor arms are in the folded position.
Figure 27:
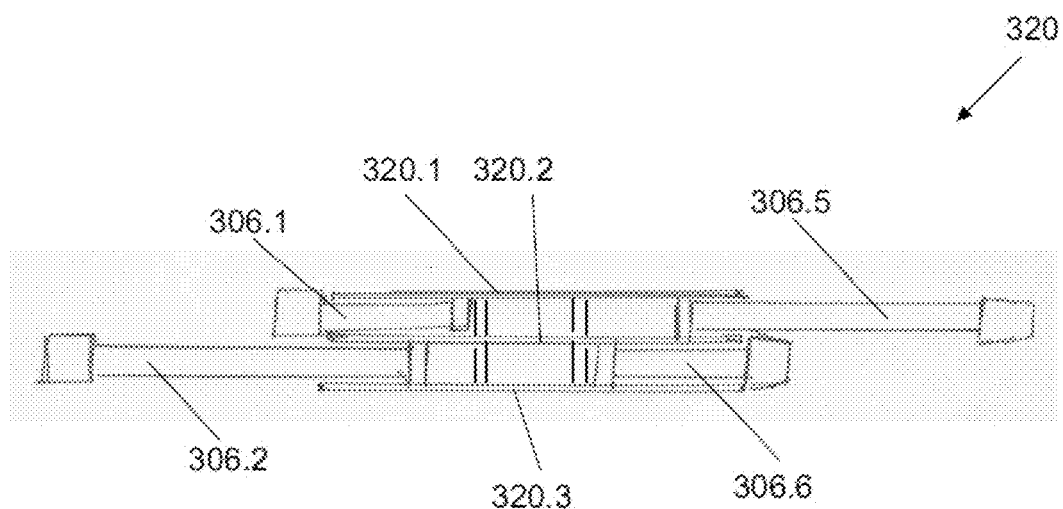
FIG. 27 is a simplified side view of the embodiment of FIG. 24.

Referring to FIG. 24 through FIG. 27, yet another embodiment 320 of an attachment interface for use with the multi-rotor UAV 100 is provided, with FIG. 24 to FIG. 26 illustrating three stages—unfolded, intermediate, and folded—of the folding process of the six rotor arms 306.1 through 306.6 in a top view and FIG. 27 illustrating the intermediate stage in a side view. As will be evident to one skilled in the art, the rotor arms 306.1 through 306.6 are unfolded by simply reversing the order of the stages of the folding process.

Each of the arms 306.1 to 306.6 is pivotally mounted via respective rotor arm attachment point 320D. 1 to 320D.6 to an attachment interface comprising three parallel attachment interfaces 320.1, 320.2, 320.3, each being similar to the one described hereinabove, with odd rotor arms 306 being mounted between the two top attachment interfaces 320.1 and 320.2 and the even rotor arms 306 being mounted between the two bottom attachment interfaces 320.2 and 320.3, as illustrated in FIG. 27.

Here the rotor arm attachment points 320D.1 to 320D.6 are oriented parallel to the central vertical axis 103.

In the unfolded position the rotor arms 306.1 to 306.6 extend radially outward from the attachment interface and the body, as illustrated in FIG. 27. All of the rotor arms 306.1 to 306.6 are rotated about their respective rotor arm attachment points 320D. 1 to 320D.6 in a same, for example, clockwise, direction, as indicated by the block arrows in FIG. 24 and FIG. 25. Alternating placement of the rotor arm attachment points 320D.1 to 320D.6 between the three parallel attachment interfaces 320.1 to 320.3 allows an outer arm portion of each of the rotor arms 306.1 to 306.6 to cross over the pivot end and an inner arm portion of an adjacent rotor arm, i.e. the following rotor arm in clockwise direction, to reach the folded position illustrated in FIG. 26.

Since all the rotor arms 306.1 to 306.6 are moved in two planes perpendicular to the central vertical axis, the attachment interface 320 can be directly mounted to the body 102, obviating the connecting columns 108 at the cost of a greater extension of the rotor arms 306 from the body 102 in the folded position. Furthermore, attachment interface 320 allows the payload and the landing gear to be directly mounted to the bottom thereof.

Furthermore, while the description of the preferred embodiments hereinbelow is with reference to a mechanism for independently moving the arms for the sake of clarity, it will become evident to those skilled in the art that the embodiments of the invention are not limited thereto, but are also adaptable for simultaneously moving the arms by coupling the same.

It will be recognized that the specific materials used in constructing the various components of the system described herein, are not considered to be limiting to the scope of the invention. Those of skill in the art will readily recognize and be able to select materials and components that will accomplish the objectives of the invention without requiring any inventive skill.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed:

1. A multi-rotor UAV having an unfolded position and a folded position, said multi-rotor UAV comprising:
   a body of the UAV, the body having a central vertical axis;
   a plurality of rotor arms each having a pivot end and an outside end and an inner arm portion extending from the pivot end to a center of the rotor arm and an outer arm portion extending from the outside end to the center of the rotor arm, each rotor arm having a rotor assembly attached to the outside end thereof; and
   the pivot end of each rotor arm being pivotally attached at a rotor arm attachment point to the body, whereby the rotor arms can pivot between the folded position and the unfolded position;
   wherein when the multi-rotor UAV is in its unfolded position each rotor arm extends radially outwardly from the body such that the rotor assemblies attached thereto are spaced in predetermined operating locations; and
   wherein when the multi-rotor UAV is in the folded position each rotor arm is pivoted from its outside end towards the body such that the outer arm portion of said rotor arm is enabled to cross the pivot end and inner arm portion of an adjacent rotor arm.

2. The multi-rotor UAV of claim 1 wherein the rotor arm attachment points are spaced at regular intervals around the circumference of the body.

3. The multi-rotor UAV of claim 1 wherein the rotor assemblies are equi-distantly positioned from the central vertical axis when in the unfolded position.

4. The multi-rotor UAV of claim 1 wherein the pivotal attachment of the plurality of rotor arms to the body is such that alternating rotor arms will deflect in opposing upwards or downwards directions in relation to a plane perpendicular to the central vertical axis of the body when moved into the folded position.

5. The multi-rotor UAV of claim 1 wherein the pivotal attachment of the plurality of rotor arms to the body is such that all of the rotor arms will deflect in the same upwards or downwards direction in relation to a plane perpendicular to the central vertical axis of the body when moved into the folded position.

6. The multi-rotor UAV of claim 5 wherein the pivotal attachment of the plurality of rotor arms to the body is such that the rotor arms will each deflect at the same angle in relation to the plane perpendicular to the central vertical axis of the body.

7. The multi-rotor UAV of claim 5 wherein the pivotal attachment of the plurality of rotor arms to the body is such that the rotor arms will not each deflect at the same angle in relation to the plane perpendicular to the central vertical axis of the body.

8. The multi-rotor UAV of claim 1 wherein each rotor arm is pivotally attached at its rotor arm attachment point by a hinge.

9. The multi-rotor UAV of claim 1 wherein the attachment interface is an integrated element of the body.

10. The multi-rotor UAV of claim 1 wherein the multi-rotor UAV further comprises an attachment interface attached to the body, on which the rotor arm attachment points are disposed and via which the rotor arms are attached to the body.

11. The multi-rotor UAV of claim 10 wherein the attachment interface comprises:
    an inner ring disposed in a plane perpendicular to the central vertical axis; and a plurality of spokes connected to the inner ring and extending beyond an outside perimeter of the inner ring a predetermined distance, the number of spokes corresponding to the number of rotor arms.

12. The multi-rotor UAV of claim 11 wherein:

the attachment interface further comprises a concentric outer ring positioned outside of and planar with the inner ring, attached to the spokes;

the spokes extend a predetermined distance beyond an outside perimeter of the outer ring.

13. The multi-rotor UAV of claim 10 wherein the attachment interface comprises an odd numbered plurality of attachment interfaces each mounted perpendicular to the central vertical axis, with rotor arm attachment points defined between adjacent pairs of said attachment interfaces, whereby adjacent rotor arms can be attached at their pivot ends between different adjacent pairs of attachment interfaces.

14. The multi-rotor UAV of claim 1 wherein the number of rotor arms is an even number.

15. The multi-rotor UAV of claim 14 wherein the number of rotor arms is an even number, and the rotor arms are divided into rotor arm pairs, each rotor arm pair having an even rotor arm and an odd rotor arm.

16. The multi-rotor UAV of claim 15 wherein the outer arm portion of the even rotor arm of a rotor arm pair will cross over the pivot end and the inner arm portion of the odd rotor arm of an adjacent rotor arm pair when in the folded position.

17. The multi-rotor UAV of claim 15 wherein the even rotor arm and the odd rotor arm of each rotor arm pair pivot in opposite directions from each other around the circumference of the body when moving into the folded position.

18. The multi-rotor UAV of claim 15 wherein the even rotor arm and the odd rotor arm of each rotor arm pair pivot in the same direction to each other around the circumference of the body when moving into the folded position.

19. The multi-rotor UAV of claim 14 wherein the number of rotor arms is greater than four.

20. The multi-rotor UAV of claim 19 wherein the number of rotor arms is six.

21. The multi-rotor UAV of claim 1 wherein the rotor arms each move independently between the folded position and the unfolded position.

22. The multi-rotor UAV of claim 1 wherein the rotor arms are coupled such that they move simultaneously between the folded position and the unfolded position.

23. The multi-rotor UAV of claim 1 further comprising a control system within the body operatively connected to the rotor assemblies.

24. The multi-rotor UAV of claim 23 wherein the control system further comprises a power supply for the rotor assemblies.

25. The multi-rotor UAV of claim 1 wherein the body further comprises landing gear.

26. The multi-rotor UAV of claim 1 further comprising a payload attached to the body.

* * * * *